US008472558B2

(12) United States Patent
Ogawa et al.

(10) Patent No.: US 8,472,558 B2
(45) Date of Patent: Jun. 25, 2013

(54) RADIO TRANSMISSION DEVICE AND RADIO TRANSMISSION METHOD

(75) Inventors: Yoshihiko Ogawa, Kanagawa (JP); Daichi Imamura, Kanagawa (JP); Sadaki Futagi, Ishikawa (JP); Atsushi Matsumoto, Ishikawa (JP); Takashi Iwai, Ishikawa (JP)

(73) Assignee: Panasonic Corporation, Osaka (JP)

(*) Notice: Subject to any disclaimer, the term of this patent is extended or adjusted under 35 U.S.C. 154(b) by 447 days.

(21) Appl. No.: 12/524,689

(22) PCT Filed: Jan. 30, 2008

(86) PCT No.: PCT/JP2008/051382
§ 371 (c)(1),
(2), (4) Date: Jul. 27, 2009

(87) PCT Pub. No.: WO2008/093716
PCT Pub. Date: Aug. 7, 2008

(65) Prior Publication Data
US 2010/0002804 A1    Jan. 7, 2010

(30) Foreign Application Priority Data
Jan. 31, 2007    (JP) ................................ 2007-022072

(51) Int. Cl.
*H03C 1/52*    (2006.01)
*H04L 27/04*    (2006.01)

(52) U.S. Cl.
USPC ............ 375/300; 375/260; 370/339; 370/394

(58) Field of Classification Search
USPC .................... 375/295, 300; 455/403
See application file for complete search history.

(56) References Cited

U.S. PATENT DOCUMENTS

| 6,990,092 B1* | 1/2006 | Siala ............................. 370/347 |
| 8,005,153 B2* | 8/2011 | Muharemovic et al. ...... 375/259 |
| 2006/0050799 A1* | 3/2006 | Hou et al. ..................... 375/260 |

(Continued)

FOREIGN PATENT DOCUMENTS

| JP | 2007-336437 | 12/2007 |
| JP | 2008-109437 | 5/2008 |
| WO | 2007-122828 | 11/2007 |
| WO | 2008/078357 | 7/2008 |

OTHER PUBLICATIONS

International Search Report dated Apr. 15, 2008.

(Continued)

*Primary Examiner* — Leon-Viet Nguyen
(74) *Attorney, Agent, or Firm* — Dickinson Wright PLLC

(57) ABSTRACT

It is possible to provide a radio transmission device and a radio transmission method which can avoid degradation of a channel estimation accuracy using a reference signal formed by a ZC sequence even when the RS transmission band of a local cell is different from that of an adjacent cell. A mobile station decides a cyclic shift sequence corresponding to RB allocation information from an RS table which correlates different frequency bandwidths from a reference point of respective transmission bands to a spectrum start number of the cyclic shift sequence so as to satisfy a particular relationship based on the sequence length and transmits the decided cyclic shift sequence as RS to a base station. The base station uses the same RS table as the RS table of the mobile station and performs correlation calculation of the RS transmitted from the mobile station, thereby performing channel estimation.

6 Claims, 25 Drawing Sheets

U.S. PATENT DOCUMENTS

| | | |
|---|---|---|
| 2007/0190967 A1* | 8/2007 | Cho et al. .................. 455/403 |
| 2007/0297381 A1 | 12/2007 | Oketani |
| 2008/0095166 A1* | 4/2008 | Wiemann et al. ............. 370/394 |
| 2008/0101214 A1 | 5/2008 | Jitsukawa |
| 2008/0181191 A1* | 7/2008 | Hillery et al. ................ 370/339 |
| 2009/0097465 A1 | 4/2009 | Inoue |
| 2009/0252112 A1 | 10/2009 | Shimomura |

OTHER PUBLICATIONS

"Sequence Allocation Method for E-UTRA Uplink Reference Signal," Huawei, R1-070367, 3GPP TSG-RAN WG1 Meeting #47bis, Jan. 2007, 3 pages.

"Zadoff-Chu sequence allocation on RACH for complexity reduction," Panasonic, NTT DoCoMo, R1-070189, 3GPP TSG-RAN WG1 Meeting #47bis, Jan. 2007, 4 pages.

"Non-synchronized RACH preamble structure for high mobility UE," Panasonic, NTT DoCoMo, R1-070188, 3GPP TSG-RAN WG1 Meeting #47bis, Jan. 2007, 11 pages.

"Uplink Reference Signal Multiplexing Structures for E-UTRA," Motorola, R1-062610, 3GPP TSG RAN WG1 Meeting #46bis, Seoul, Korea, Oct. 2006, 16 pages.

"Narrow band uplink reference signal sequences and allocation for E-UTRA," Panasonic, R1-063183, 3GPP TSG RAN WG1 Meeting#47, Riga, Latvia, Nov. 2006, 4 pages.

Japanese Office Action dated May 29, 2012.

* cited by examiner

|  | CYCLIC SHIFT SEQUENCE NUMBER # (CELL #1) | CYCLIC SHIFT SEQUENCE NUMBER # (CELL #2) |
|---|---|---|
| RB1~RB2 | 1 | 2 |
| RB2~RB3 | 1 | 2 |
| RB3~RB4 | 1 | 2 |
| RB4~RB5 | 1 | 2 |
| RB5~RB6 | 1 | 2 |
| RB6~RB7 | 1 | 2 |

FIG.20 A

|  | CYCLIC SHIFT SEQUENCE NUMBER # (CELL #1) | CYCLIC SHIFT SEQUENCE NUMBER # (CELL #2) |
|---|---|---|
| RB1~RB2 | 1 | 2 |
| RB2~RB3 | 2 | 1 |
| RB3~RB4 | 1 | 2 |
| RB4~RB5 | 2 | 1 |
| RB5~RB6 | 1 | 2 |
| RB6~RB7 | 2 | 1 |

FIG.20 B

| SUBCARRIER NUMBER | COEFFICIENT OF ZC SEQUENCE (N=23) |
|---|---|
| $f_1$ | $C_1$ |
| $f_2$ | $C_2$ |
| $f_3$ | $C_3$ |
| ⋮ | ⋮ |
| $f_{23}$ | $C_{23}$ |
| $f_{24}$ | $C_1$ |
| $f_{25}$ | $C_2$ |
| ⋮ | ⋮ |
| $f_{12k-1}$ | $C_{12k-1 \bmod (23)}$ |
| $f_{12k}$ | $C_{12k \bmod (23)}$ |
| $f_{12k+1}$ | $C_{12k+1 \bmod (23)}$ |
| ⋮ | ⋮ |

FIG.24

RADIO TRANSMISSION DEVICE AND RADIO TRANSMISSION METHOD

TECHNICAL FIELD

The present invention relates to a radio transmitting apparatus and radio transmission method that use CAZAC sequences (i.e. Constant Amplitude and Zero Auto-correlation Code), including Zadoff-Chu sequences (hereinafter "ZC sequences"), for reference signals (hereinafter "RSs").

BACKGROUND ART

In 3GPP LTE (3rd Generation Partnership Project Long-term Evolution), studies are conduct to use a ZC sequence as an RS in uplink. This ZC sequence is a kind of CAZAC sequence and represented by the following equation 1.

(Equation 1)

$$a_{r,m}(k) = \begin{cases} \exp\left\{\frac{-j2\pi r}{N}\left(\frac{(k+m\Delta)^2}{2}\right)\right\}, & \text{when } N \text{ is even} \\ \exp\left\{\frac{-j2\pi r}{N}\left(\frac{(k+m\Delta)(k-m\Delta+1)}{2}\right)\right\}, & \text{when } N \text{ is odd,} \end{cases} \quad [1]$$

$$k = 0, 1, \ldots, N-1$$

Here, N is the sequence length of the ZC sequence and r is the ZC sequence number (i.e. sequence index), and N and r are coprime. Reasons to study a ZC sequence as an RS include constant frequency response characteristics, good auto-correlation characteristics and good cross-correlation characteristics between sequences (between sequences of different sequence numbers).

Further, if the sequence length N of a ZC sequence is a prime number, N−1 sequences of good cross-correlation characteristics can be generated. At this time, the cross-correlation between sequences (e.g. different ZC sequence numbers r=1 and r=5) is fixed at $\sqrt{N}$. If the sequence length N is not a prime number, the maximum value of cross-correlation between sequences is equal to or more than $\sqrt{N}$.

Further, ZC sequences can be used as a cyclic shift sequence (hereinafter the cyclic shift sequence number is m). Here, a cyclic shift sequence refers to a ZC sequence having the same sequence number r and applied a different amount of cyclic shift (hereinafter simply "the amount of shift"), which can be generated by cyclically shifting a ZC sequence by an amount of shift in the time domain. For example, FIG. 1 shows a ZC sequence (m=0) of a sequence length N=12 and amount of shift Δ=6, and its cyclic shift sequence (m=1). In the figure, the ZC sequence (m=0) is configured in ascending order from a(0) to a(11), and its cyclic shift sequence (m=1), which is the ZC sequence (m=0) cyclically shifted by Δ(=6) symbols, is configured in ascending order from a(6) to a(11) and from a(0) to a(5).

Next, the processing of an RS in the receiver will be explained. When the above two sequences are multiplexed upon the same time and the same frequency, in the correlation result in the correlator of the receiver, the sequence of m=0 and the sequence of m=1 each produce a high correlation value (hereinafter "correlation value peak") at timings the amount of shift Δ apart (see FIG. 2). The amount of shift Δ is set greater than the maximum delay time of delay waves, so that the correlation value peak of each cyclic shift sequence is generated only within the range of the amount of shift Δ. Therefore, by extracting only the correlation value from the period (i.e. the window part) where the correlation value of the desired cyclic shift sequence is present, as shown in FIG. 3, it is possible to detect the correlation results of individual cyclic shift sequences separately. Consequently, cyclic shift sequences can be used as orthogonal sequences on conditions that the correlation values at respective amounts of shift are present in separate windows.

Correlation calculation for cyclic shift sequences is generally processed in the frequency domain, and the correlator shown in FIG. 2 performs DFT (Discrete Fourier Transform) processing, division by a ZC sequence (m=0) and IFFT (Inverse Fast Fourier Transform) processing.

FIG. 4 is a block diagram showing the configuration of a general receiver. In this figure, DFT section 11 performs DFT processing on a received RS, and outputs the RSs after the DFT processing to subcarrier demapping section 12.

Subcarrier demapping section 12 extracts, from the RSs outputted from DFT section 11, the parts corresponding to the transmission band, and outputs the extracted RSs to division section 13.

Division section 13 divides the RSs outputted from subcarrier demapping section 12 by a ZC sequence (m=0), and outputs the correlation values, which are the division results, to IDFT section 14.

IDFT section 14 performs IDFT processing (Inverse Discrete Fourier Transform) on the correlation values outputted from division section 13, and outputs the correlation values after the IDFT processing to masking processing section 15.

Masking processing section 15 extracts only the correlation value in the period (i.e. the window part) where the correlation value of the desired cyclic shift sequence is present, from the correlation values outputted from IDFT section 14, and outputs the extracted correlation value as a channel estimation value, to DFT section 16.

DFT section 16 performs DFT processing on the correlation value outputted from masking processing section 15, and outputs the signal after the DFT processing.

F(X) represents the X-th symbol generated by performing DFT processing on a ZC sequence (or its cyclic shift sequence). Alternately, F(X) represents the X-th symbol generated by generating a ZC sequence directly in the frequency domain.

Meanwhile, amongst the RSs used in uplink, studies are underway to transmit the reference signal for channel estimation used to demodulate data (hereinafter "DM-RS," which stands for demodulation reference signal) in the same band as the data transmission bandwidth. That is, when the data transmission bandwidth is a narrow band, it naturally follows that the DM-RS is transmitted in a narrow band. For example, if the data transmission bandwidth is one RB (resource block), the DM-RS is also one RB, and, if the data transmission bandwidth is two RBs, the DM-RS is also two RBs. Here, the RB is the unit of radio frequency allocation in the frequency domain, and is formed with, for example, one or a plurality of frequency subcarriers (hereinafter "subcarriers").

If one RB is formed with 12 subcarriers, a ZC sequence having a sequence length N of 12 symbols (where N is not a prime number), or 11 or 13 symbols (where N is a prime number), is used for the DM-RS using one RB, and a ZC sequence having a sequence length N of 24 symbols (where N is not a prime number), or 23 symbols or 29 symbols (where N is a prime number), is used for the DM-RS using two RBs. Here, when ZC sequences having sequence lengths of 11 symbols and 23 symbols are used, DM-RSs of 12 symbols and 24 symbols are generated by performing cyclic extension. Further, when ZC sequences having sequence lengths of 13 symbols and 29 symbols are used, DM-RSs of 12 symbols and 24 symbols are generated by performing truncation.

Further, to reduce inter-cell interference between RSs, studies are underway to assign different ZC sequences for the DM-RS between cells. However, a shortage in the number of orthogonal sequences available for use in narrowband transmission or a shortage in the number of quasi-orthogonal sequences having low cross-correlation, has been raised as an issue. If the times to take to transmit DM-RSs are respectively the same, the sequence lengths of DM-RSs (the number of symbols) decrease in the narrowband transmission. For the reason, the number of sequences (N−1) decreases, and the distance between cells where the same ZC sequence is used decreases. As a result, the influence of interference between cells by DM-RSs increases and the accuracy of channel estimation is damaged significantly.

In order to make the distance longer between cells using the same ZC sequence in narrowband transmission, Non-Patent Document 1 and 2 propose assigning different cyclic shift sequences m of the same sequence number r between cells where synchronization of transmission frame timing (e.g. cells belonging to the same base station) or time synchronization between base stations is established (see FIG. 5). For example, in cells belonging to the same base station (e.g. the three cells shown by oblique lines in FIG. 5), ZC sequences having the same sequence number r are used. In cell #1, the cyclic shift sequences m=1 and 4 are used, in cell #2, the cyclic shift sequences m=2 and 5 are used, and in cell #3, the cyclic shift sequences m=3 and 6 are used. As a result, it is possible to make the distance longer between cells using ZC sequences of the same sequence number r. Further, DM-RSs under the same base station are orthogonal (i.e. ZC sequences of cyclic shift sequences), not quasi-orthogonal (i.e. ZC sequences of different sequence numbers r), so that it is possible to reduce interference from nearby cells by DM-RSs and improve the accuracy of channel estimation.

Non-Patent Document 1: Motorola, R1-062610, "Uplink Reference Signal Multiplexing Structures for E-UTRA," 3GPP TSG RAN WG1 Meeting #46 bis, Seoul, Korea, Oct. 9-13, 2006

Non-Patent Document 2: Panasonic, R1-063183, "Narrow band uplink reference signal sequences and allocation for E-UTRA," 3GPP TSG RAN WG1 Meeting #47, Riga, Latvia, Nov. 6-10, 2006

DISCLOSURE OF INVENTION

Problems to be Solved by the Invention

Incidentally, DM-RSs are transmitted in the same band as the data transmission band, and data and RSs are frequency-multiplexed between users (localized FDM). Further, the data transmission band is determined by the scheduler of each cell. For this reason, the transmission band for the DM-RS varies between cells (see FIG. 6). In FIG. 6, DM-RSs (360 kHz bandwidth) are transmitted using RB 1 and RB 2 (FIG. 6(a)) in cell #1, and using RB 2 and RB 3 in cell #2 (FIG. 6(b)). In this case, the base stations of cell #1 and cell #2 receive a combination of DM-RSs of different transmission bands (FIG. 6(c)). Here, if a delay profile (correlation value) of the combined DM-RSs is calculated in cell #1 based on the RS transmission band of cell #1, the correlation value peak of the DM-RS for cell #2 is produced in a position that does not agree with the amount of shift set in advance in the time domain (see FIG. 7).

This is because dividing processing for the DM-RS that arrives from a mobile station in cell #2 (division section 13) is different from dividing processing by a ZC sequence (m=0). For example, as shown in FIG. 7, when the DM-RS of cell #2 is received in cell #1, the spectrum value at the beginning of this DM-RS is divided by the seventh spectrum value of the ZC sequence (m=1). As a result, the correlation value peak of the DM-RS of cell #2 is produced in a position that does not agree with the amount of shift set in advance in the time domain. At this time, if a delay profile (correlation value) of the DM-RS of cell #2 is created in the window of cell #1, it is not possible to separate the delay profile of cell #1 and the delay profile of cell #2, and the DM-RS of cell #2 becomes interference components against cell #1 and damages the accuracy of channel estimation using the DM-RS of cell #1. Although cases will be explained below using cell #1 and cell #2 and cyclic shift sequences m=11 and m=2, these are by no means limiting.

FIG. 8 shows a correlation result in the case where correlation is calculated between ZC sequences which have a 24-subcarrier receiving bandwidth (360 kHz) and which have bands 12 subcarriers apart (180 kHz) in the frequency domain. Here, ZC sequences of sequence length N=24 and sequence number r=13 are used, and the amount of shift Δ=12. Further, in FIG. 8, in cell #1, the dotted line shows the correlation result in the case where the transmission band and the band to calculate the correlation value for the cyclic shift sequence are different, and the solid line shows the correlation result in the case where these match. Referring to FIG. 8, the correlation value peak for the amount of shift 12 is generated accurately in the second half with the solid line, in contrast, the correlation value peak is generated in the first half, not in the second half, with the dotted line.

In this way, cyclic shift sequences are assigned and generated by taking into consideration of the local cell alone. To be more specific, ZC sequences and cyclic shifted ZC sequences are assigned based only on the transmission bandwidth (i.e. the number of RBs). Consequently, similar to the case where these ZC sequences and cyclic shifted ZC sequences are assigned to different bands, there is a problem that relationships cannot be held in the case where the components of the ZC sequence for the local cell used in correlation calculation and the components of a ZC sequence for a nearby cell are assigned to different bands. This problem is not limited to DM-RSs, and RSs hereinafter will therefore not be limited to DM-RSs and cover SRSs (Sounding Reference Signals), which serve as reference signals in CQI estimation, downlink RSs, and pilot signals for synchronization.

It is therefore an object of the present invention to provide a radio transmitting apparatus and radio transmission method that prevent the accuracy of channel estimation using reference signals formed with CAZAC sequences from deteriorating even when the RS transmission band varies between the local cell and nearby cells.

Means for Solving the Problem

A radio transmitting apparatus of the present invention adopts a configuration including: a determination section that determines a pattern of a CAZAC sequence based on a transmission band and transmission bandwidth of a reference signal to be transmitted from the radio transmitting apparatus; and a transmission section that transmits the CAZAC sequence of the determined pattern as a reference signal.

Advantageous Effects Of Invention

According to the present invention, it is possible to prevent the accuracy of channel estimation using reference signals formed with CAZAC sequences from deteriorating even when the RS transmission band varies between the local cell and nearby cells.

BRIEF DESCRIPTION OF DRAWINGS

FIG. 20 shows the assignment table for the cyclic shift sequence numbers;

FIG. 24 shows the relationships between the coefficients of ZC sequences to be transmitted and the subcarriers.

BEST MODE FOR CARRYING OUT THE INVENTION

Figure 1:
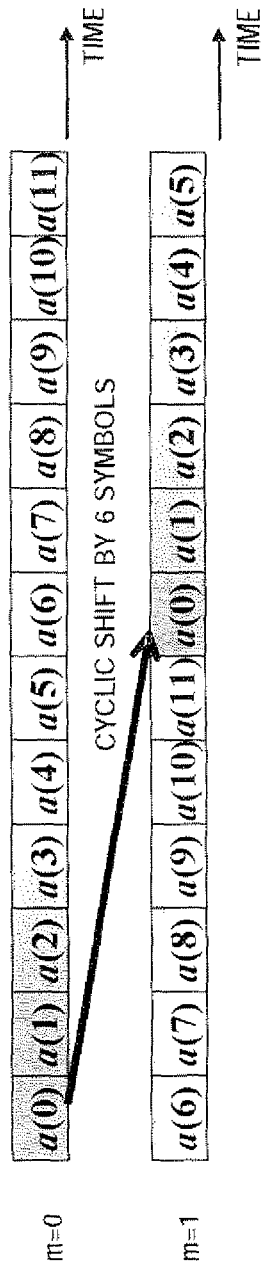
FIG. 1 shows how to cyclically shift a ZC sequence.
Figure 2:
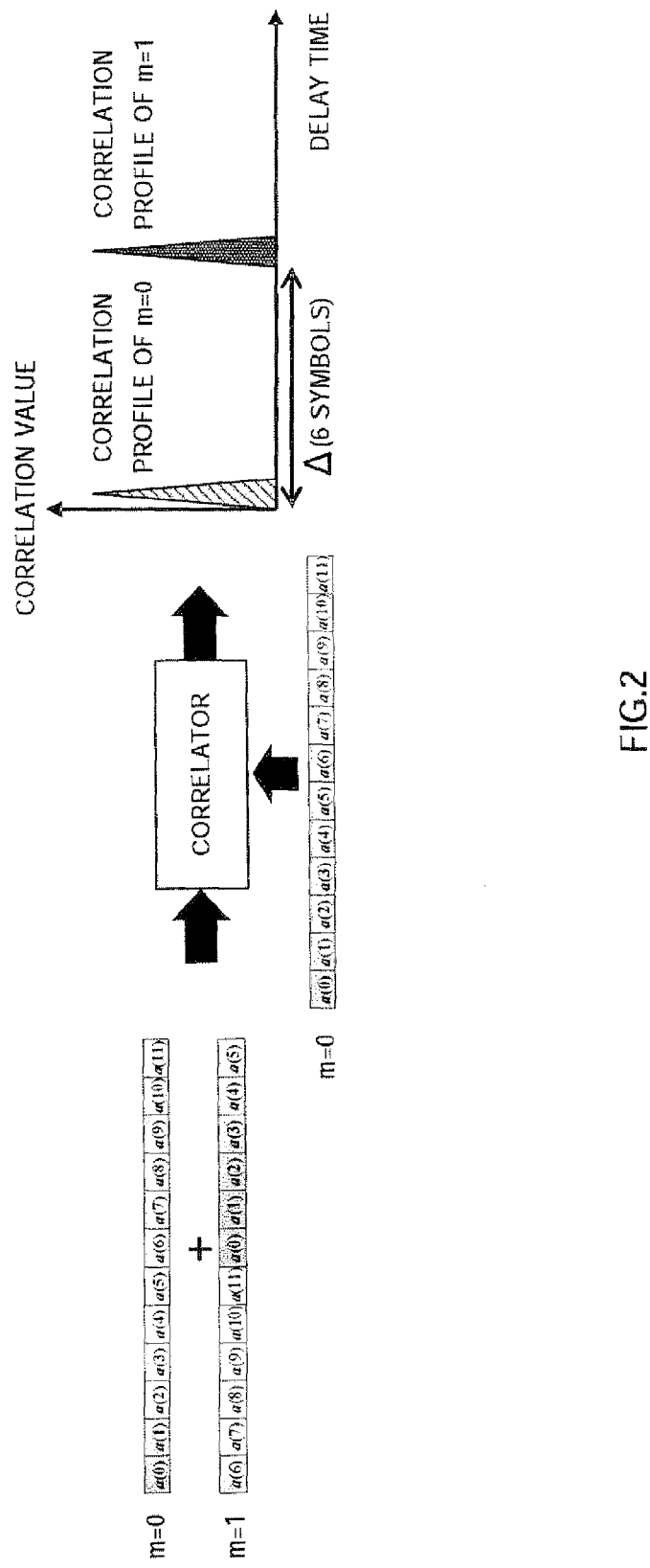
FIG. 2 shows the correlation result of the reception ZC sequences.
Figure 3:
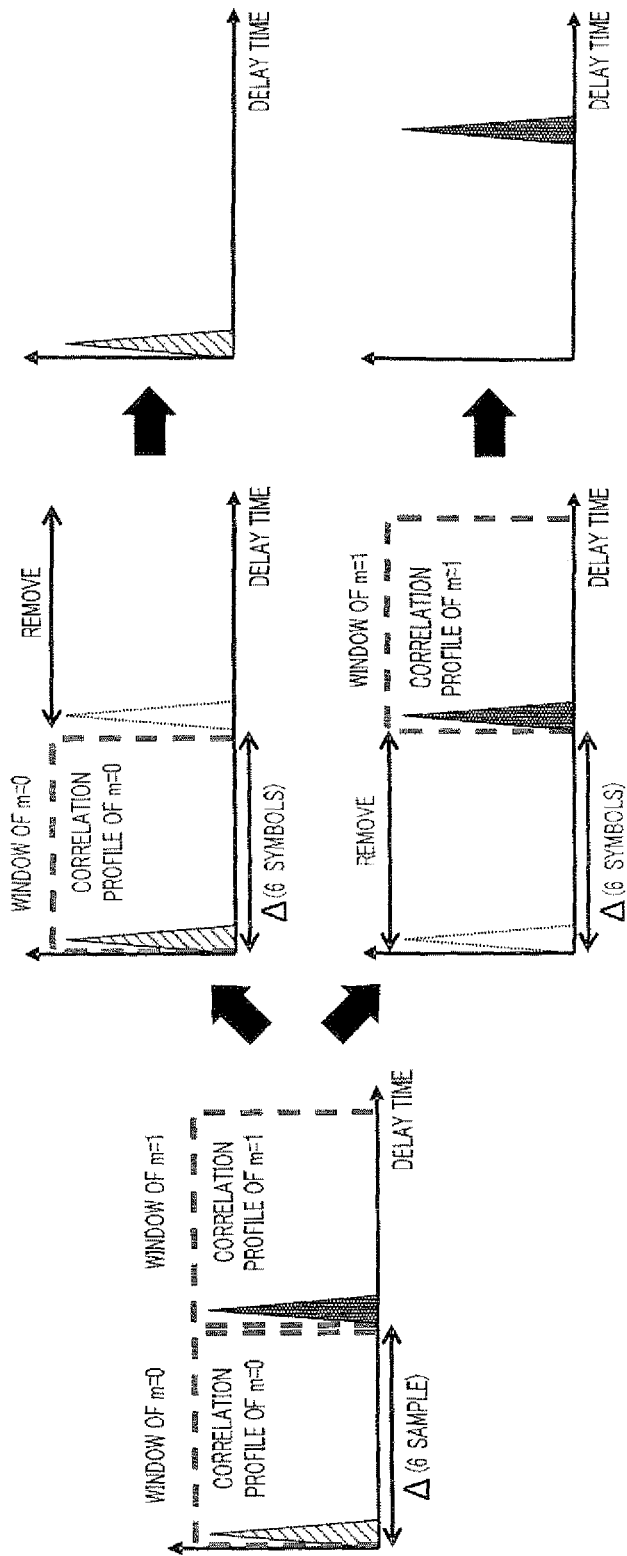
FIG. 3 shows detection and demultiplexing of the cyclic shift sequences.
Figure 4:
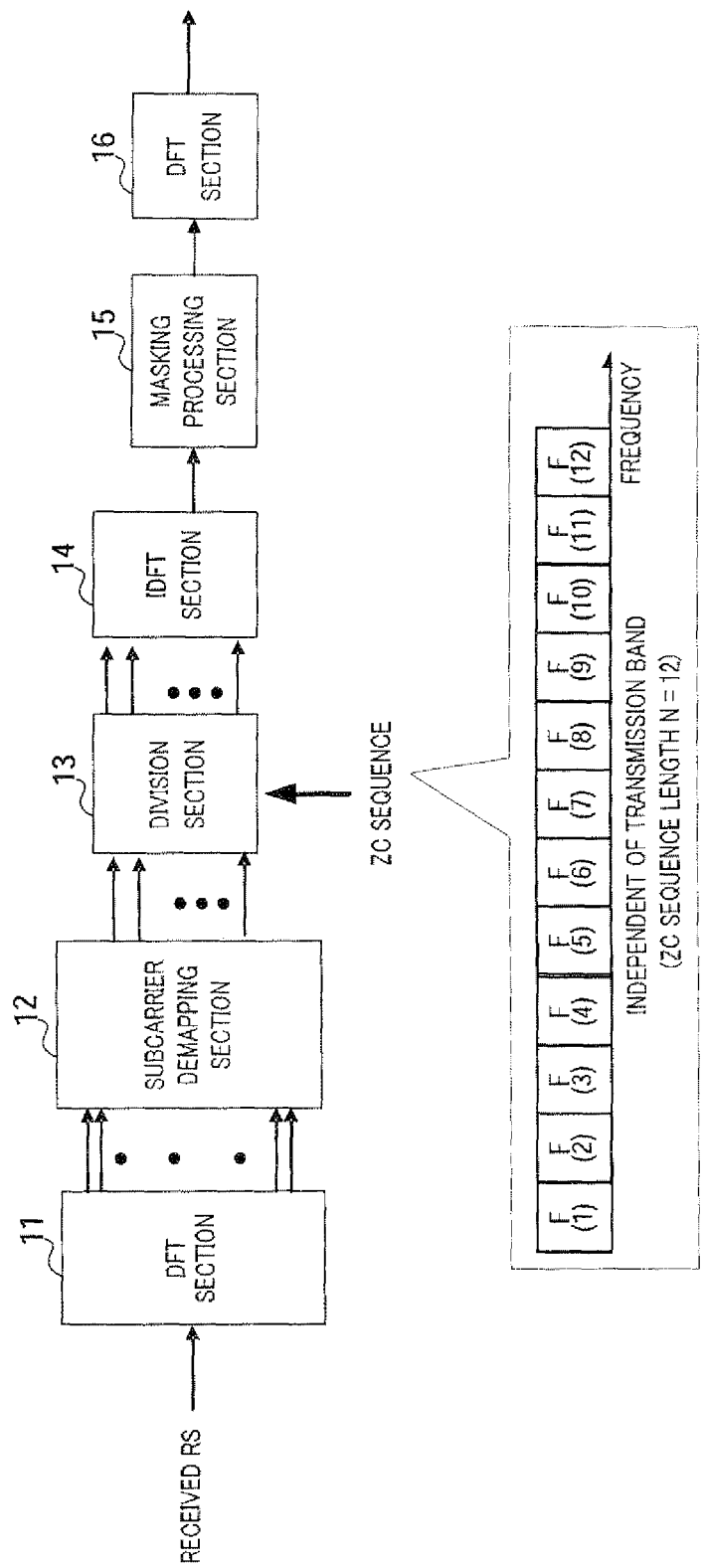
FIG. 4 is a block diagram showing the configuration of the general receiver.
Figure 5:
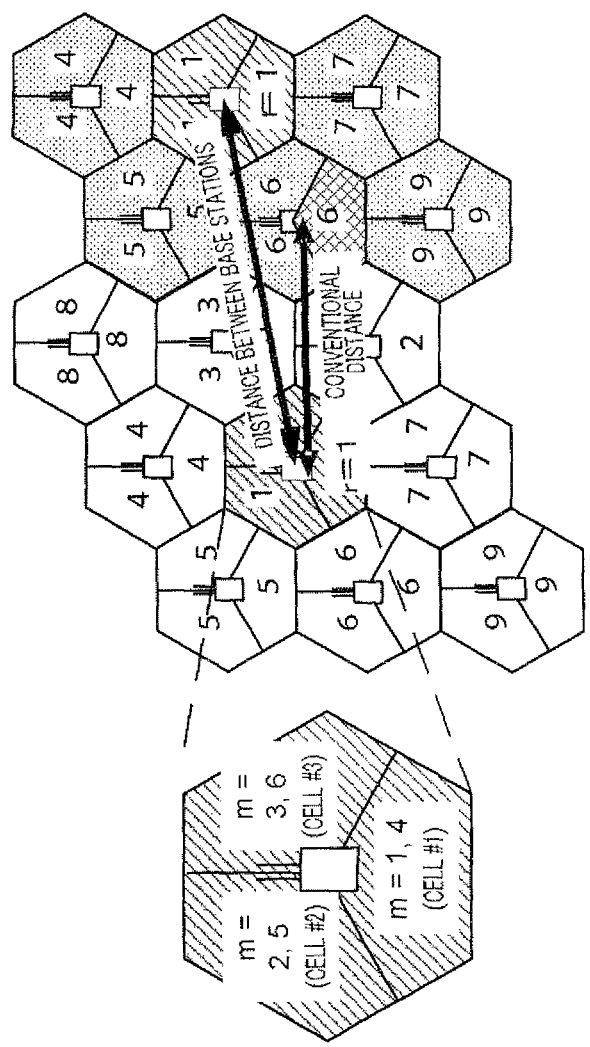
FIG. 5 shows assigning a ZC sequence to a cell.
Figure 6:
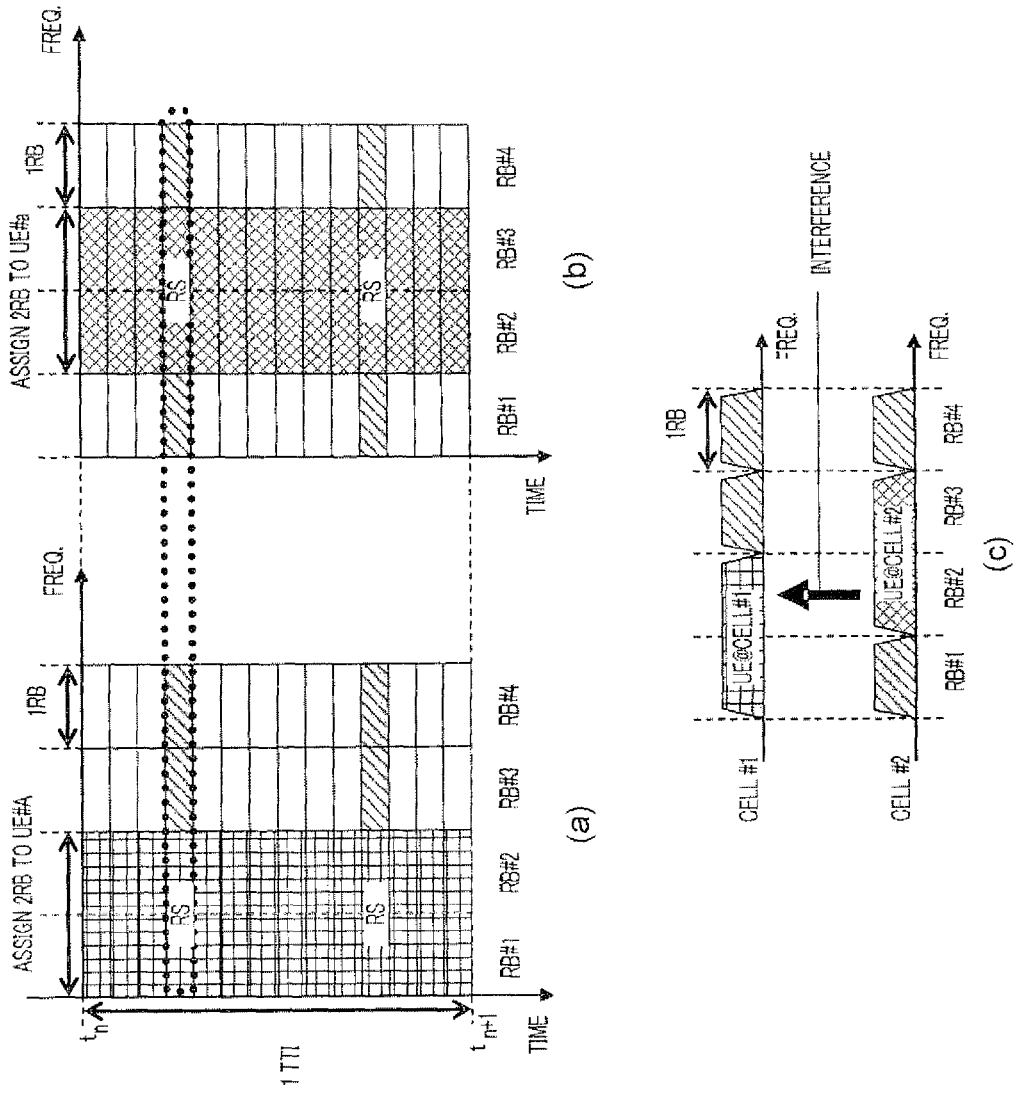
FIG. 6 shows that different RS transmission bands are used between nearby cells.
Figure 7:
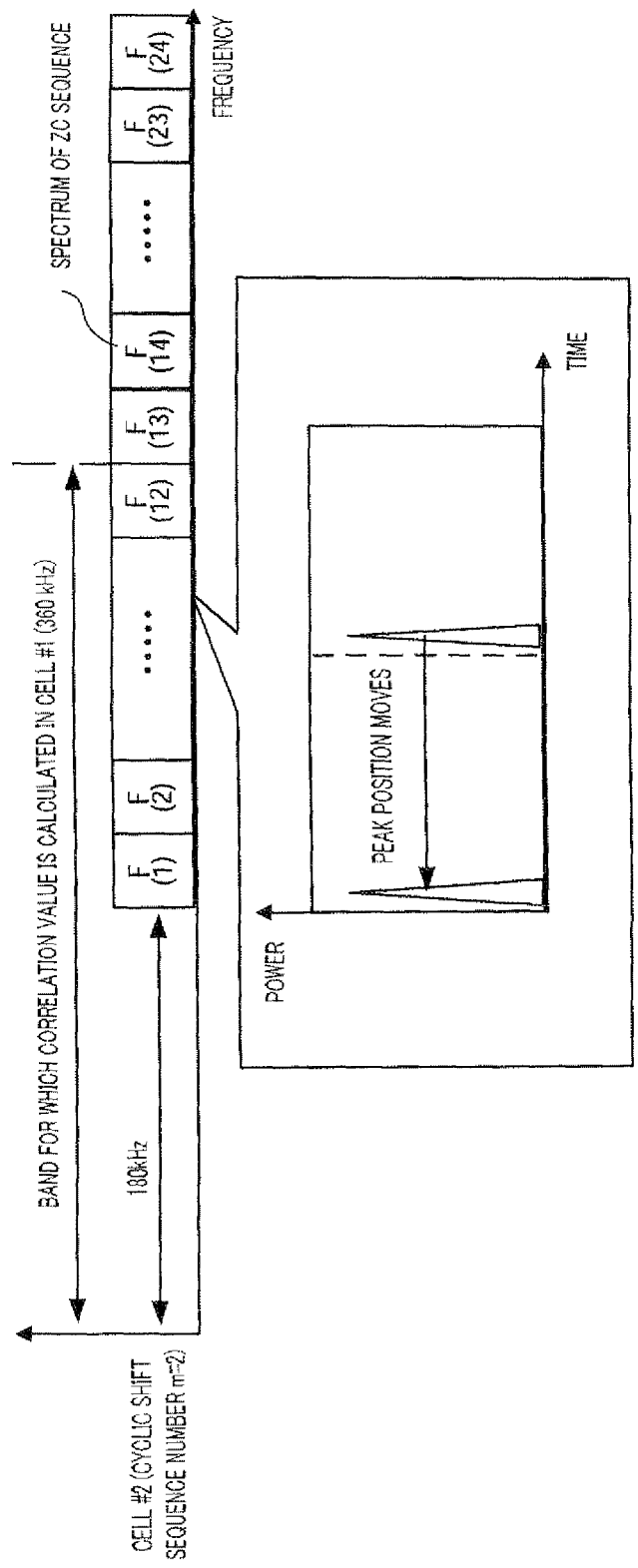
FIG. 7 shows the position of a correlation value peak in the case where different RS transmission bands are used between nearby cells.
Figure 8:
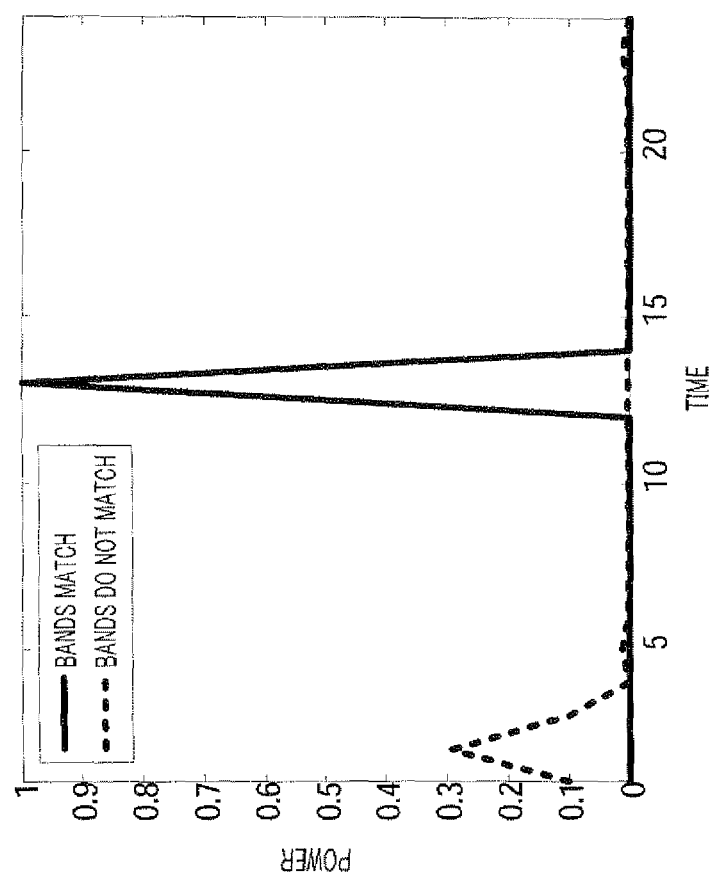
FIG. 8 shows the correlation result where the transmission band and the band to calculate a correlation value match and correlation result where the bands do not match.

Now, embodiments of the present invention will be described in detail with reference to the accompanying drawings. Further, in embodiments, the components having the same functions will be assigned the same reference numerals and overlapping descriptions will be omitted. Further, in the following description, an area where a high correlation value (i.e. one or a plurality of high correlation values) is generated will be defined as a "correlation value peak."

Embodiment 1

The configuration of mobile station 100 according to Embodiment 1 will be explained using FIG. 9. RF receiving section 102 performs receiving processing, including down-conversion and A/D conversion, on a signal received via antenna 101, and outputs the signal after the receiving processing to demodulation section 103. Demodulation section 103 performs equalization processing and demodulation processing on the signal after the receiving processing, and outputs the signal after these processing to decoding section 104. Decoding section 104 decodes the signal after the demodulation processing and extracts the data signal and control information. Further, in the extracted control information, the RB (resource block) allocation information is outputted to pattern generation section 109 in RS generation section 108.

Coding section 105 encodes transmission data and outputs the encoded data to modulation section 106. Modulation section 106 modulates the encoded data and outputs the modulated signal to RB allocation section 107. RB allocation section 107 allocates the modulated signal to RBs and outputs the modulated signal allocated to RBs to multiplexing section 113.

RS generation section 108, which has pattern generation section 109, mapping section 110, IFFT section 111 and cyclic shift section 112, generates an RS (reference signal) from a ZC sequence based on an RS table and the RB allocation information outputted from decoding section 104, and outputs the generated RS to multiplexing section 113. Now, the components in RS generation section 108 will be explained.

Pattern generation section 109, which has an RS table, extracts the ZC sequence in the band matching the RB allocation information outputted from decoding section 104 from the RS table, and outputs the extracted ZC sequence to mapping section 110. Here, the RS table is formed, when a frequency determined in the system band for convenience serves as the reference point, by assigning a number to the spectrum of a ZC sequence in ascending order from this reference point to higher frequencies (or in descending order to lower frequencies) and aligning the numbered spectra in repetition with numbers within the sequence length. A specific example of the RS table will be explained later.

Mapping section 110 maps the ZC sequence outputted from pattern generation section 109 to a band corresponding to the transmission band of mobile station 100, and outputs the mapped ZC sequence to IFFT section 111. IFFT section 111 performs IFFT (Inverse Fast Fourier Transform) processing on the ZC sequence outputted from mapping section 110 and outputs the ZC sequence after the IFFT processing to cyclic shift section 112.

Cyclic shift section 112 cyclically shifts the ZC sequence outputted from IFFT section 111 by a predetermined amount of shift, and outputs the cyclically shifted ZC sequence as an RS to multiplexing section 113. Here, the amount of cyclic shift in cyclic shift section 112 is a value that is assigned per cell or mobile station on a unique basis, and the mobile stations determine the amount of shift based on information reported from the base station. As for the manner in which this information is reported, the amount of shift may be reported as is, or any other manners of reporting may be applicable. In the case where cyclic shift sequences are assigned to a plurality of cells belonging to the same base station, the amounts of shift to be assigned to the individual cells are set with such values that, when mobile stations belonging to the individual cells transmit cyclic shift sequences using the same transmission band based on the respective amounts of shift, the base station can separate the correlation results. The cyclic shift may be performed before the IFFT section. In this case, the cyclic shift is performed in the frequency domain, and therefore realized by phase rotations per subcarrier.

Multiplexing section 113 time multiplexes the transmission data outputted from RB allocation section 107 (modulated signal) and the ZC sequence outputted from cyclic shift section 112 (reference signal) and outputs the multiplexed signal to RF transmitting section 114. The method of multiplexing in multiplexing section 113 is not limited to time multiplexing, and may be frequency multiplexing, code multiplexing and IQ multiplexing on a complex space.

Transmitting RF section 114 performs transmission processing, including D/A conversion, up-conversion and amplification, on the multiplexed signal outputted from multiplexing section 113, and transmits via radio the signal after the transmission processing from antenna 101.

The configuration of base station 150 according to Embodiment 1 of the present invention will be explained using FIG. 10. Coding section 151 encodes transmission data and a control signal and outputs the coded data to modulation section 152. Modulation section 152 modulates the coded data, and outputs the modulated signal to RF transmitting section 153. RF transmitting section 153 performs transmission processing, including D/A conversion, up-conversion and amplification, on the modulated signal, and transmits the signal after the transmission processing via radio from antenna 154.

RF receiving section 155 performs receiving processing, including down-conversion, A/D conversion, on a signal received via antenna 154, and outputs the signal after the receiving processing to demultiplexing section 156.

Demultiplexing section 156 demultiplexes the signal outputted from RF receiving section 155 into the RS, data signal and control signal, and outputs the demultiplexed RS to DFT section 157 and the data signal and control signal to DFT section 164.

DFT section 157 performs DFT processing on the RS outputted from demultiplexing section 156, transforms the time domain signal to frequency domain signal, and outputs the RS transformed into the frequency domain, to demapping section 159 of channel estimation section 158.

Channel estimation section 158, which has demapping section 159, division section 160, IFFT section 161, masking processing section 162 and DFT section 163, estimates channels based on the RS outputted from DFT section 157.

Demapping section 159 extracts the parts corresponding to the transmission band of each mobile station from the signal outputted from DFT section 157, and outputs the extracted signals to division section 160.

Figure 9:
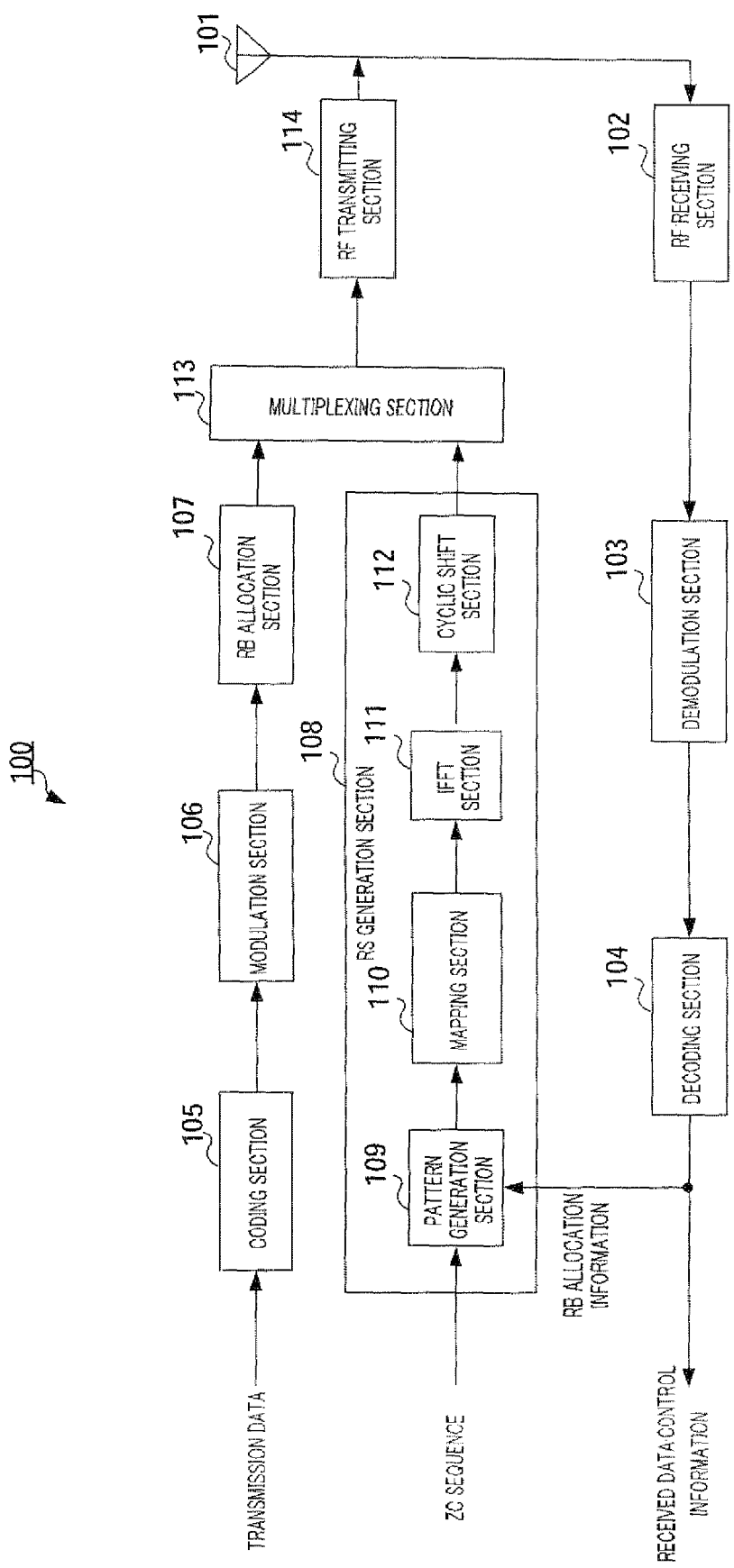
FIG. 9 is a block diagram showing the configuration of the mobile station according to Embodiment 1 of the present invention.

Division section 160, having the same RS table as in pattern generation section 109 in mobile station 100 shown in FIG. 9, divides the signals outputted from demapping section 159 by the corresponding ZC sequences in the RS table, and outputs the division results to IFFT section 161. IFFT section 161 performs IFFT processing on the signals outputted from division section 160, and outputs the signals after the IFFT processing to masking processing section 162.

By masking the signals outputted from IFFT section 161, masking processing section 162 extracts the correlation value in the period (the window part) where the correlation value of the desired cyclic shift sequence is present, and outputs the extracted correlation value to DFT section 163.

DFT section 163 performs DFT processing on the correlation value outputted from masking processing section 162 and outputs the correlation value after the DFT processing to frequency domain equalization section 166. The signal outputted from DFT section 163 represents the frequency response of the channel.

DFT section 164 performs DFT processing on the data signal and control signal outputted from demultiplexing section 156, transforms the time domain signals to frequency domain signals, and outputs the data signal and control signal transformed into the frequency domain, to demapping section 165.

Demapping section 165 extracts the data signal and control signal from the part corresponding to the transmission band of each mobile station, from the signal outputted from DFT section 164, and outputs the extracted signals to frequency domain equalization section 166.

Frequency domain equalization section 166 equalizes the data signal and control signal outputted from demapping section 165 using the signal (the frequency response of the channel) outputted from DFT section 163 in channel estimation section 158, and outputs the signals after the equalization processing to IFFT section 167.

IFFT section 167 performs IFFT processing on the data signal and control signal outputted from frequency domain equalization section 166, and outputs the signal after the IFFT processing to demodulation section 168. Demodulation section 168 demodulates the signal after the IFFT processing, and outputs the demodulated signal to decoding section 169. Decoding section 169 decodes the demodulated signal, and extracts received data.

Division section 160 performs dividing processing using corresponding ZC sequences in the RS table, and masking processing section 162 performs masking processing, so that the correlation value is extracted from the period (the window part) where the correlation value of the desired cyclic shift sequence is present, and other methods may be applied if equivalent receiving processing is carried out. For example, dividing section 160 performs dividing processing by general ZC sequences that are not associated in the RS table, and masking processing section 162 performs masking processing corresponding to the RS table, so that the correlation value in the period (the window part) where the correlation value of the desired cyclic shift sequence is present may be extracted.

Figure 11:
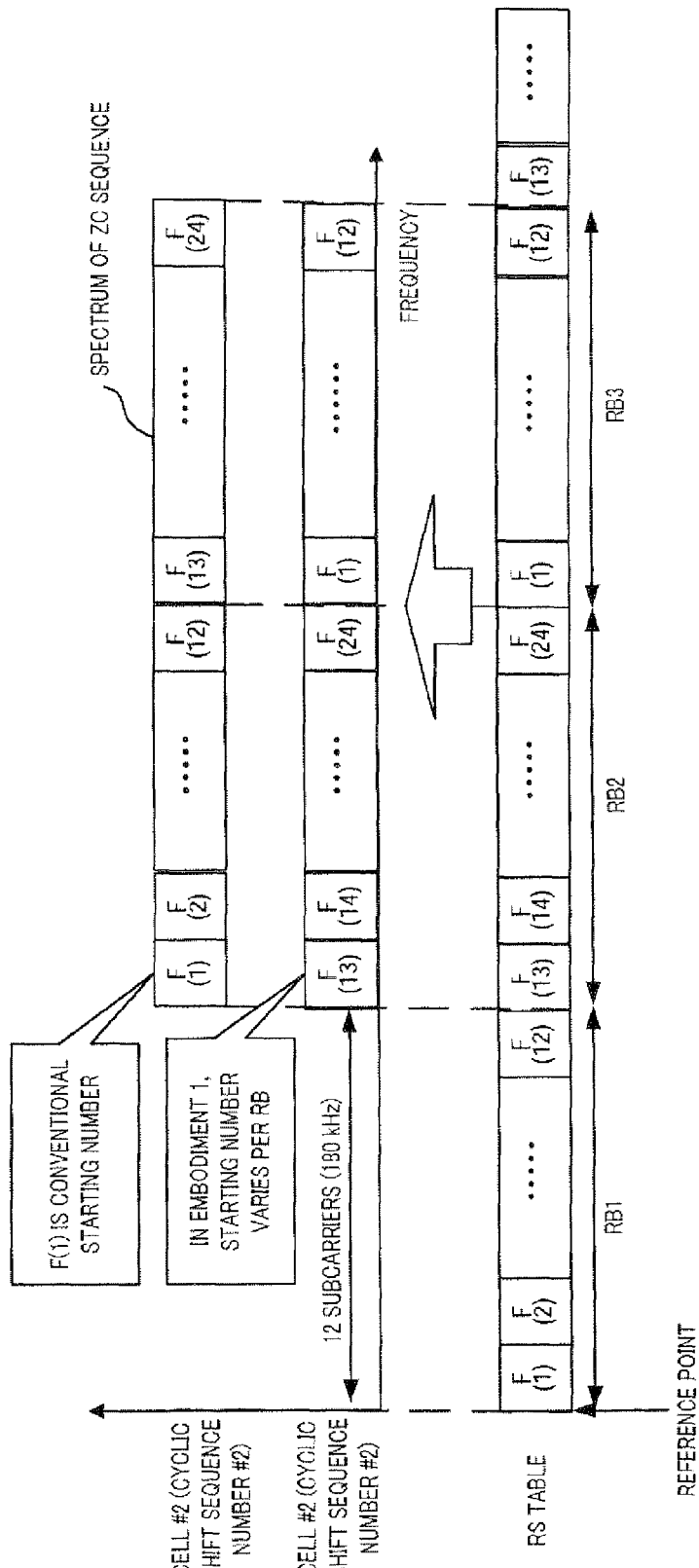
FIG. 11 is an illustration provided to explain the pattern generation section in FIG. 9.

Next, the operations of pattern generation section 109 as described above will be explained using FIG. 11. Here, in cell #2, a ZC sequence, which is a cyclic shift sequence m=2, having a sequence length N=24 and sequence number r=1, is used, and the amount of shift Δ=12. Further, as shown in FIG. 11, in the RS table that pattern generation section 109 has, spectrum numbers F(1) to F(24) are assigned starting from the reference point and allocated in repetition. Here, F(x) represents the x-th frequency spectrum of the ZC sequence acquired by converting a ZC sequence in the frequency domain, or, in a case of generating a ZC sequence in the frequency domain, represents the x-th symbol of the ZC sequence.

As shown in FIG. 11, if a proportion of the transmission bandwidth (e.g. RB 2 and RB 3) from the band 12 subcarriers (180 kHz) apart from the reference point is specified as the RB allocation information, pattern generation section 109 extracts a ZC sequence matching this RB allocation information from the RS table, that is, extracts the pattern F(13) to F(24) and F(1) to F(12). At this time, the beginning of the sequence, that is, the spectrum number closest to the reference point (hereinafter "starting number") is 13. The spectrum of the band 0 kHz apart from the reference point (e.g. RB 1 and RB 2) has the starting number 1.

In other cells (e.g. cell #1), the starting number of the spectrum in the position 180 kHz apart from the reference point is 13 and the starting number of the spectrum in the position 0 kHz apart from the reference point is 1. Further, for reference, FIG. 11 shows the sequence generated by a conventional method always starts from the starting number 1, regardless of the positions of the subcarriers to transmit (i.e. the positions of the RBs).

Figure 12:
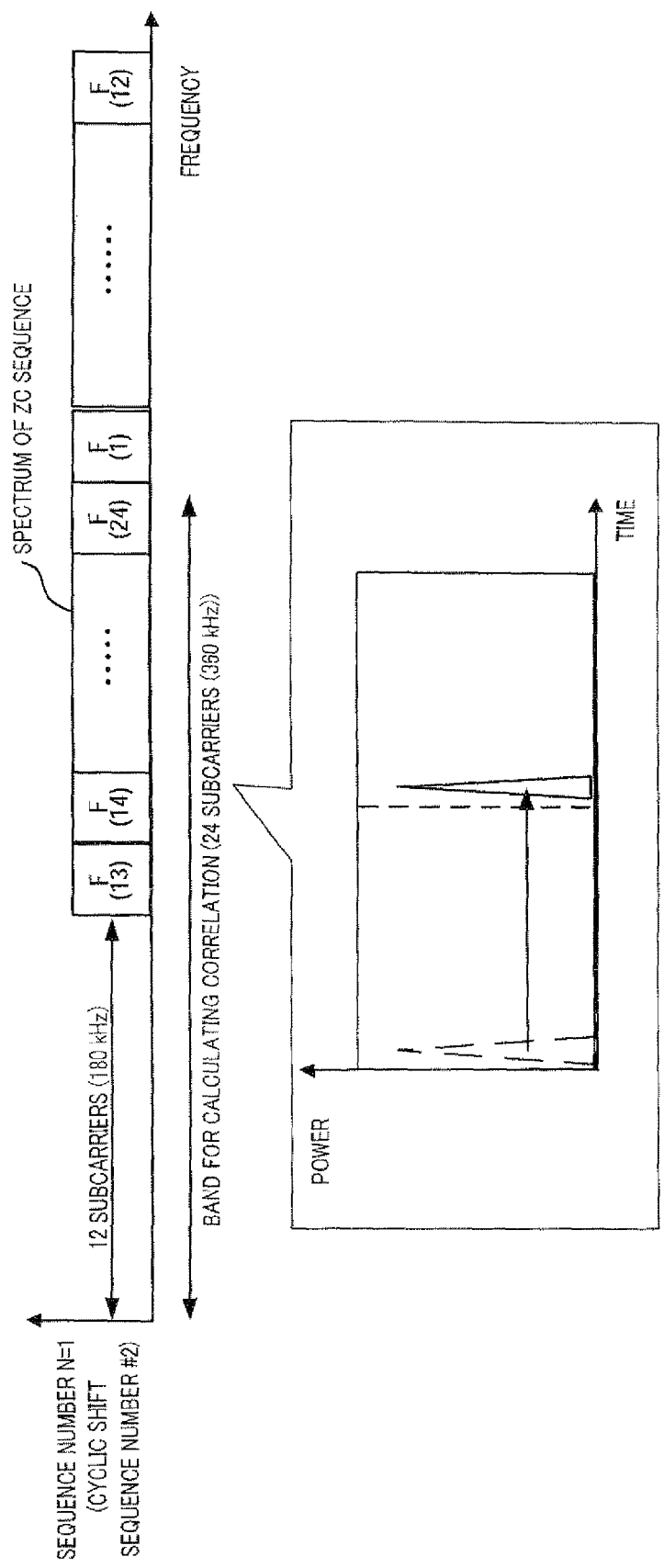
FIG. 12 shows the position of a correlation value peak.

In this way, in the band for calculating correlation, by keeping the same relationships (that is, by maintaining relative relationships) between the components of the ZC sequence for the local cell and the components of a ZC sequence for a nearby cell, regardless of the transmission bands, it is possible to generate a correlation value peak in a position in accordance with the amount of shift set in the time domain, as shown in FIG. 12. Possible methods of keeping the same relationships include, for example, associating RS transmission bands and starting numbers of the spectra of ZC sequences, that is, associating different frequency bandwidths from the reference point of a transmission band and the starting numbers of spectra of ZC sequences to fulfill specific relationships in accordance with the sequence length. Then, even when the band to transmit a cyclic shift sequence and the band to calculate the correlation value are different, the correlation value peaks are produced within the set window by this method although the correlation value peaks are produced within different windows from the set window in a conventional case. Therefore, it is possible to reduce interference except for the window corresponding to the amount of shift and improve the accuracy of channel estimation. Further, it is possible to fix the positions of correlation value peaks in the same processing regardless of sequence numbers.

Figure 13:
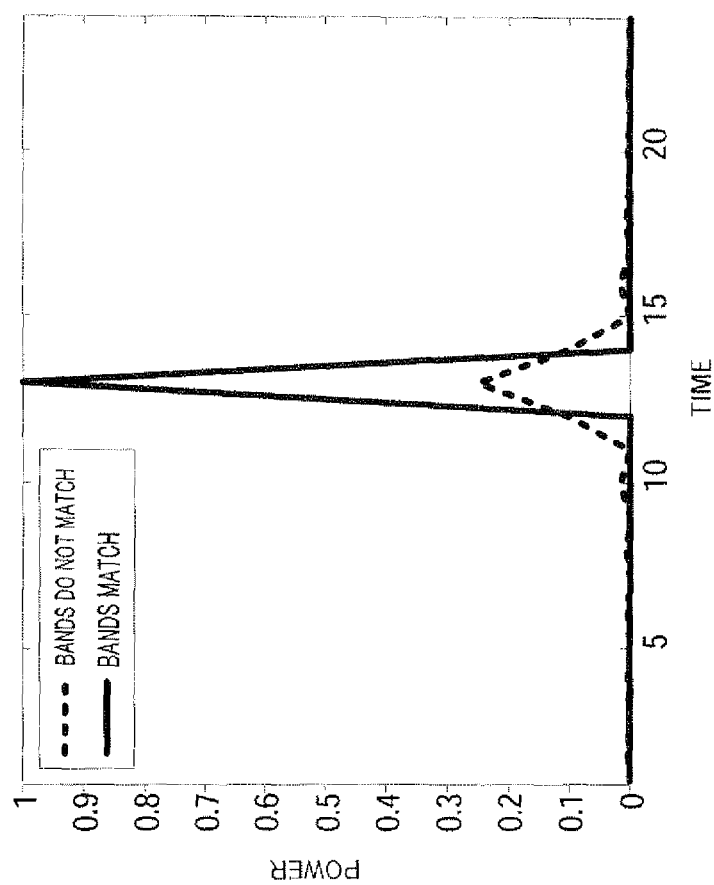
FIG. 13 shows the correlation results where the transmission band and the band for which correlation value is calculated match and does not match.

Here, in the case of calculating correlation in a 24-subcarrier bandwidth (360 kHz), FIG. 13 shows the correlation result of cyclic shift sequences transmitted in bands 12 subcarriers (180 kHz) apart in the frequency domain. A ZC sequence of a sequence length N=24 and sequence number r=13 is used, and the amount of shift Δ=12. Further, the dotted line shows the case where the band to transmit the cyclic shift sequence and the band to calculate the correlation value are different, and the solid line shows the case where these match. This figure shows that the correlation value peak at the amount of shift Δ=12 is generated in the second half accurately, with the solid line and the dotted line.

In this way, according to Embodiment 1, by associating RS transmission bands and starting numbers of spectra of ZC sequences, it is possible to generate correlation value peaks in positions in accordance with the amount of shift set in the time domain, reduce interference except for the window corresponding to the amount of shift, and improve the accuracy of channel estimation.

Although a case has been explained with the present embodiment using the RS table shown in FIG. 11 as an example, the present invention is not limited to this, and any RS table that fulfills specific relationships and that is shared between the transmitting side and the receiving side may be applied. Further, the above RS table does not always need to be provided, and the RS table may not be provided as long as equivalent processing to above processing can be performed.

Figure 14:
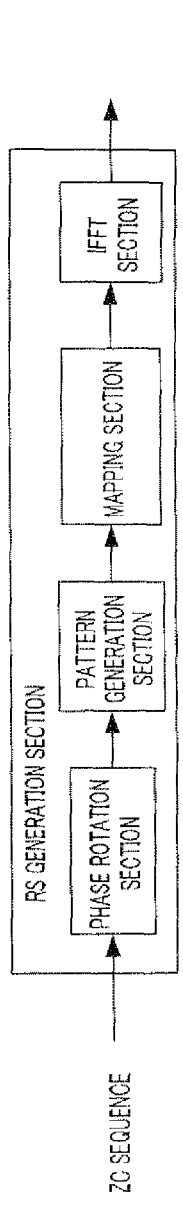
FIG. 14 shows another internal configuration of the RS generation section according to Embodiment 1 of the present invention.
Figure 14:
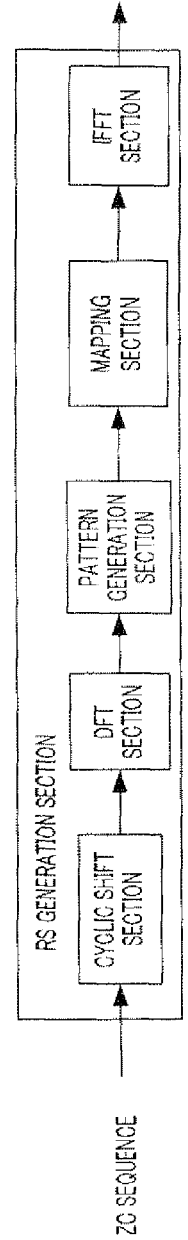

Further, although a case has been explained with the present embodiment where RS generation section 108 in mobile station 100 is as shown in FIG. 9, the RS generation section may have the configurations shown in FIGS. 14A and 14B. FIG. 14A shows the configuration in the case where a ZC sequence is generated in the frequency domain, and FIG. 14B shows the configuration in the case where a ZC sequence is generated in the time domain. In the configuration shown in FIG. 14A, phase rotation is applied to subcarriers in the frequency domain in the phase rotation section such that cyclic shift is applied in the time domain.

Although a case has been explained with the present embodiment where one RB is 12 subcarriers (180 KHz), the number of subcarriers per RB, the intervals between subcarriers and the bandwidth are not limited to these.

Further, although a case has been explained with the present embodiment as an example where a DM-RS is used as the reference signal, the present invention is not limited to this, and other reference signals using a CAZAC sequence may be used.

The base station may calculate the starting number of a ZC sequence corresponding to the transmission band calculated in pattern generation section 109 and may report the starting number.

Embodiment 2

Although a case has been explained above with Embodiment 1 where the length of a ZC sequence is a multiple of the number of subcarriers in one RB, a case will be explained with Embodiment 2 of the present invention where the length of a ZC sequence is a prime number.

Figure 10:
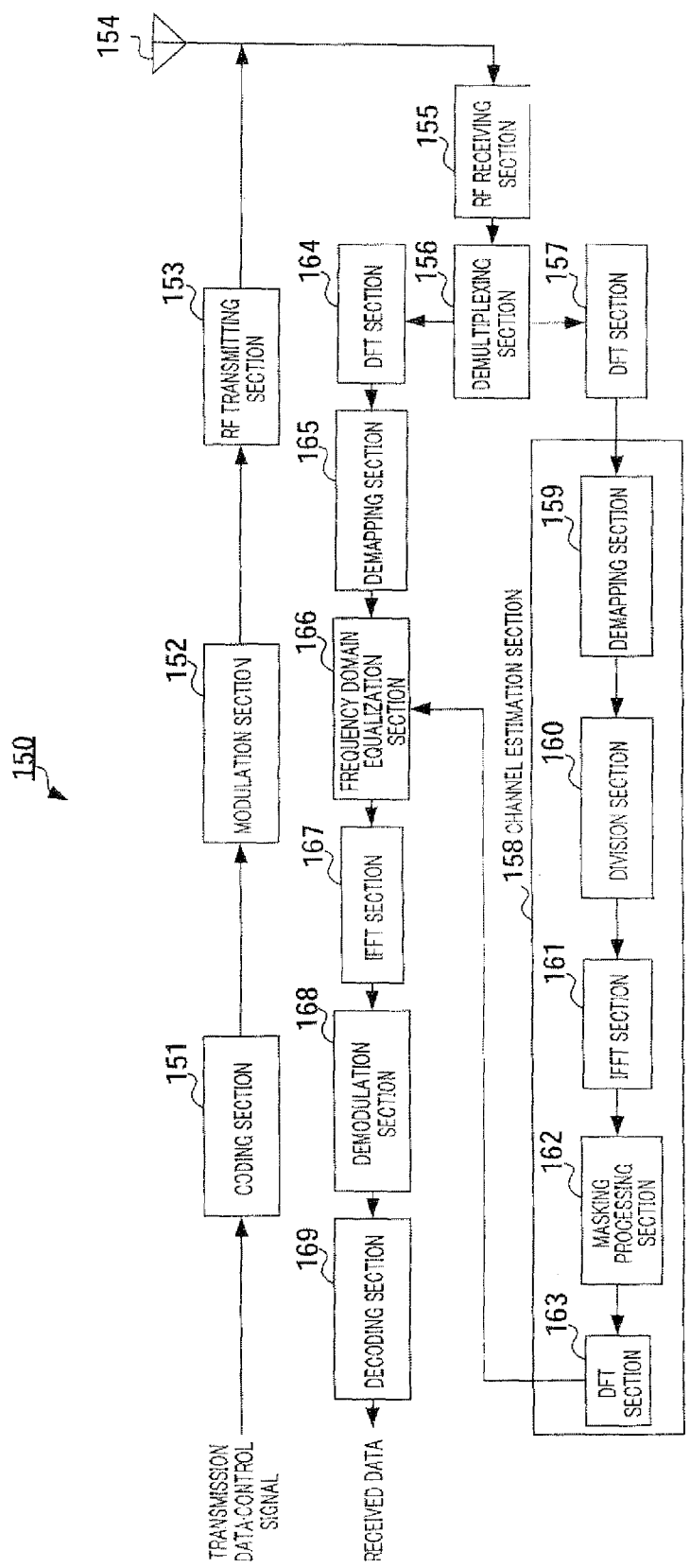
FIG. 10 is a block diagram showing the configuration of the base station according to Embodiment 1 of the present invention.

Further, the configurations of a mobile station and base station according to Embodiment 2 of the present invention are the same as shown in FIGS. 9 and 10 illustrating Embodiment 1, and therefore will be explained with reference to FIGS. 9 and 10.

Generally, to adjust a ZC sequence having a sequence length of a prime number to the number of subcarriers in the RS transmission band, studies are underway to generate RSs by cyclic extension and generate RSs by truncation. Now, these RSs will be explained.

Generally, an RS generated by cyclic extension of a ZC sequence generally uses the ZC sequence having a sequence length of the prime number less than and closet to the number of subcarriers in the RS transmission band, and part of this ZC sequence is repeated depending on the number of subcarriers. For example, in the case where the RS transmission band is 24 subcarriers, a ZC sequence having a sequence length of 23 is selected. Then, to adjust this ZC sequence to the number of subcarriers, one symbol from the beginning of the selected ZC sequence is added to the end of the ZC sequence.

Next, the operations of pattern generation section 109 to use the configuration of the RS by cyclic extension will be explained using FIG. 15. Here, in cell #2, a ZC sequence, which is cyclic shift sequence m=2, having a sequence length N=23 and sequence number r=1, is used and the amount of shift Δ=12. Further, as shown in FIG. 15, in the RS table that pattern generation section 109 has, spectrum numbers F(1) to F(23) are assigned starting from the reference point and allocated in repetition.

Figure 15:
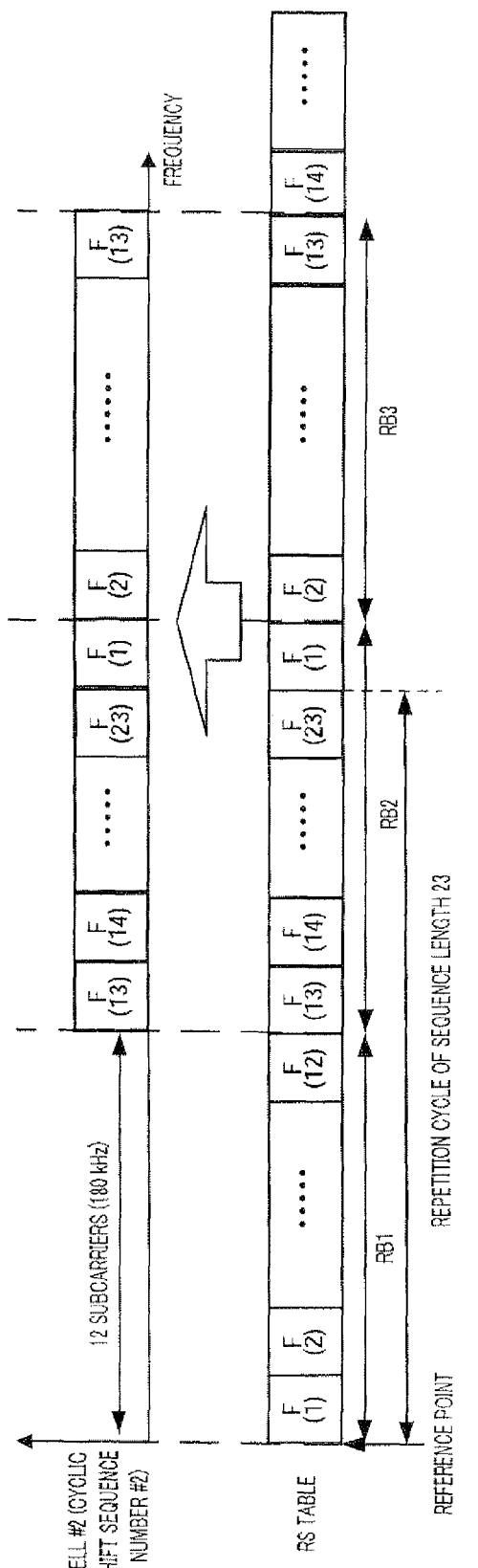
FIG. 15 is an illustration provided to explain the pattern generation section upon using the ZC sequence by cyclic extension.

As shown in FIG. 15, if a proportion of the transmission bandwidth (e.g. RB 2 and RB 3) from the band 12 subcarriers (180 kHz) apart from the reference point is specified as the RB allocation information, pattern generation section 109 extracts a ZC sequence matching this RB allocation information from the RS table, that is, extracts the pattern of F(13) to F(23) and F(1) to F(13). Further, if a proportion of the transmission bandwidth (e.g. RB 3 and RB 4) from the band 24 subcarriers (360 kHz) apart from the reference point is specified, pattern generation section 109 extracts a ZC sequence matching this RB allocation information from this RS table, that is, extracts the pattern of F(2) to F(23) and F(1) to F(2).

Next, an RS generated by truncation of a ZC sequence uses the ZC sequence having a sequence length of the prime number equal to or more than and closest to the number of subcarriers in the RS transmission band, and part of this ZC sequence is truncated (is shorten) depending on the number of subcarriers. For example, in the case where the RS transmission band is 24 subcarriers, a ZC sequence having a sequence length of 29 is selected. Then, to adjust this ZC sequence to the number of subcarriers, five symbols are truncated.

Next, the operations of pattern generation section 109 to use the configuration of the RS by truncation will be explained using FIG. 16. Here, in cell #2, a ZC sequence, which is cyclic shift sequence m=2, having sequence length N=29 and sequence number r=1 is used, and the amount of shift Δ=12. Further, as shown in FIG. 16, in the RS table that pattern generation section 109 has, spectrum numbers F(1) to F(29) are assigned from the reference point and allocated in repetition.

Figure 16:
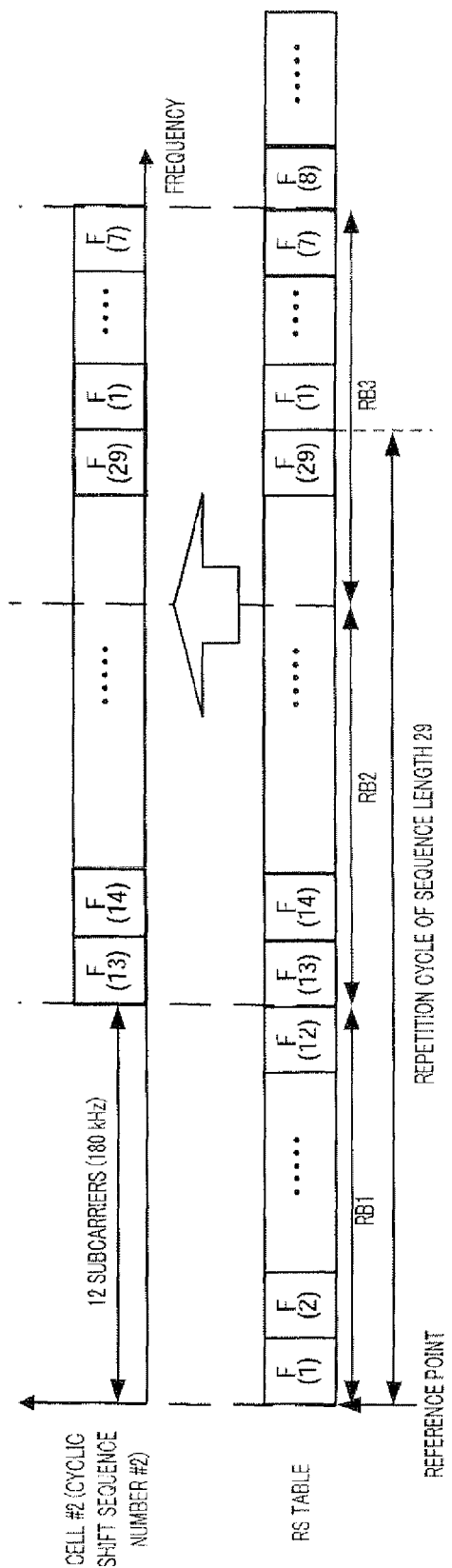
FIG. 16 is an illustration provided to explain the pattern generation section upon using the ZC sequence by truncation.

As shown in FIG. 16, if a proportion of the transmission bandwidth (e.g. RB 2 and RB 3) from the band 12 subcarriers (180 kHz) apart from the reference point is specified as the RB allocation information, pattern generation section 109 extracts a ZC sequence matching this RB allocation information from the RS table, that is, extracts the pattern of F(13) to F(29) and F(1) to F(7). Further, if a proportion of the transmission bandwidth (e.g. RB 3 and RB 4) from the band 24 subcarriers (360 kHz) apart from the reference point is specified, pattern generation section 109 extracts a ZC sequence matching this RB allocation information is extracted from the RS table, that is, extracts the pattern of F(25) to F(29) and F(1) to F(19).

The cyclic extension and the truncation of the ZC sequence may be carried out in the time domain, not the frequency domain. In this case, the number of spectra to be generated in a ZC sequence is the same as the number of subcarriers, so that spectrum components are assigned to subcarriers on a unique basis by the same method as in Embodiment 1.

In this way, according to Embodiment 2, even when a ZC sequence length is a prime number and is different from the number of subcarriers, similar to Embodiment 1, it is possible to generate correlation value peaks in positions in accordance with the amount of shift set in the time domain, reduce interference except for the window corresponding to the amount of shift, and improve the accuracy of channel estimation.

In the case where an RS is formed by using a prime number as is without using cyclic extension or truncation, pattern generation section 109 adopts the same configuration as in the case of carrying out cyclic extension. In the case where the number of subcarriers in an RS is 24, pattern generation section 109 generates and allocates an RS in the same way as performs cyclic extension of the ZC sequence with sequence length N=23, replaces one symbol in the RS with a null (without signal or zero), and outputs the RS to mapping section 110. Here, the symbol to be made null may be any subcarriers amongst the subcarriers corresponding to the transmission RB, and the subcarrier in the lowest frequency or the highest frequency is preferable to maintain the orthogonality of the ZC sequences.

Embodiment 3

Figure 17:
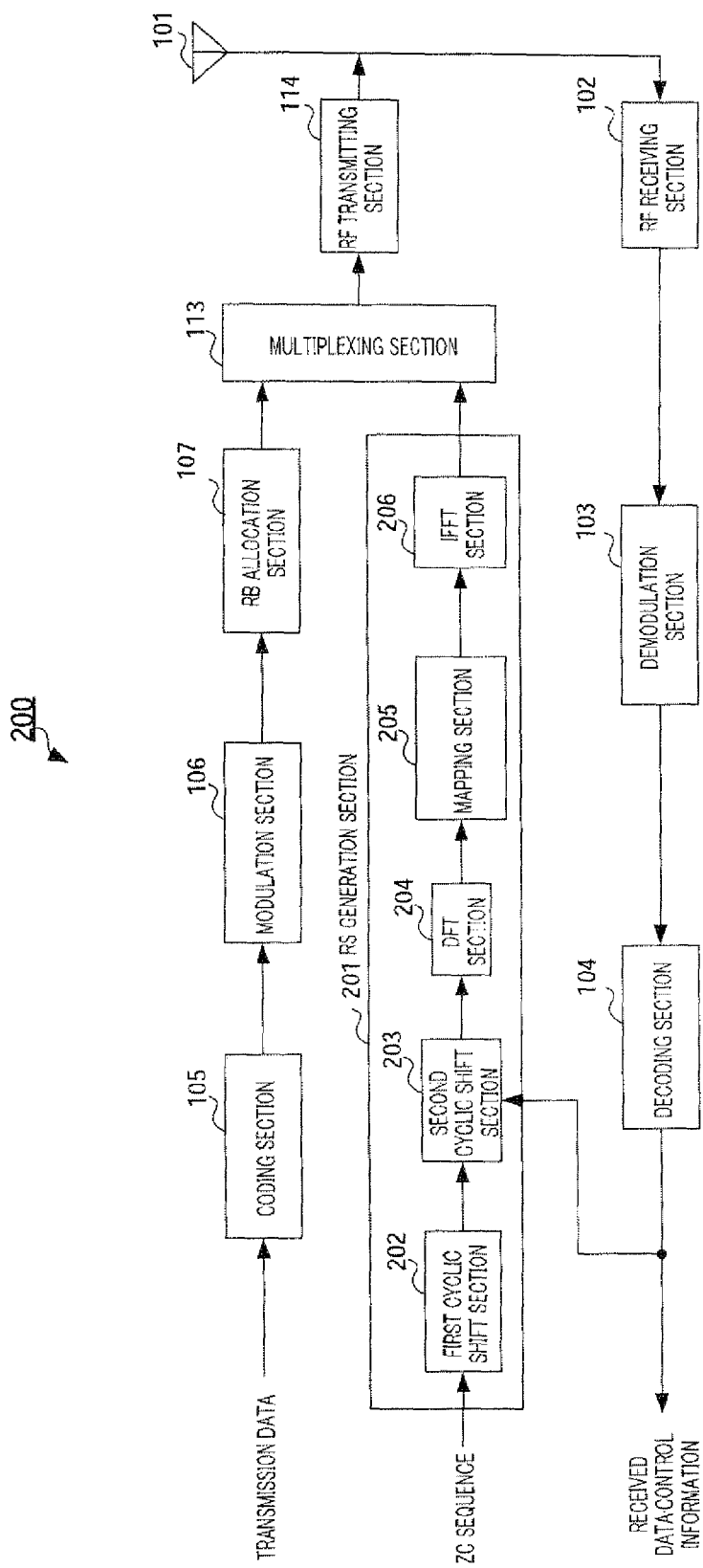
FIG. 17 is a block diagram showing the configuration of the mobile station according to Embodiment 3 of the present invention.

The configuration of mobile station 200 according to Embodiment 3 of the present invention will be explained using FIG. 17. FIG. 17 is different from FIG. 9 in changing RS generation section 108 to RS generation section 201.

RS generation section 201, which has first cyclic shift section 202, second cyclic shift section 203, DFT section 204, mapping section 205 and IFFT section 206, generates an RS from a ZC sequence and outputs the generated RS to multiplexing section 113. Now, the components of sections in RS generation section 201 will be explained.

First cyclic shift section 202 cyclically shifts a ZC sequence by a predetermined amount of shift (by the amount of shift assigned per cell or mobile station regardless of the transmission band), the ZC sequence subject to the cyclic shift to second cyclic shift section 203.

Second cyclic shift section 203 cyclically shifts the ZC sequence further outputted from first cyclic shift section 202 by an amount of shift in accordance with the transmission band, and outputs the ZC sequence subject to the cyclic shift, to DFT section 204. At this time, "the amount of shift in accordance with the transmission band" relates to the sequence length, sequence number, intervals between subcarriers and correlation value between the reference point (i.e. the reference subcarrier) and the frequency band for transmission, and is associated with these to fulfill specific relationships in accordance with the sequence length.

This amount of shift in accordance with the transmission band is shared between the transmitting side and the receiving side, because the base station reports or fixes it in advance.

DFT section 204 performs DFT processing on the ZC sequence outputted from second cyclic shift section 203 and outputs the ZC sequence after the DFT processing to mapping section 205. Mapping section 205 maps the ZC sequence outputted from DFT section 204 to a band corresponding to transmission band of the mobile station, and outputs the mapped ZC sequence to IFFT section 206. IFFT section 206 performs IFFT processing on the ZC sequence outputted from mapping section 205, and outputs the ZC sequence after IFFT processing as an RS to multiplexing section 113.

The configurations of a base station according to Embodiment 3 of the present invention are the same as shown in FIG. 10 illustrating Embodiment 1, and only different in functions from division section 160, which will be explained with reference to FIG. 10.

Division section 160 divides the signal outputted from demapping section 159 by the ZC sequence subject to DFT processing, and outputs the division result to IFFT section 161. The ZC sequence (m=0) is formed from a ZC sequence (m=0), which is added to the amount of shift in accordance with the transmission band in second cyclic shift sequence 203 and then subject to DFT processing. Further, the starting number of the spectrum in the ZC sequence is 1 in a band 0 kHz apart from the reference point (e.g. RB 1 and RB 2) or a band 12 subcarriers apart (i.e. 180 kHz) from the reference point (e.g. RB 2 and RB 3).

Although, a ZC sequence (m=0) is subject to division processing in division section 160 with a ZC sequence (m=0) to which an amount of shift in accordance with the transmission band is added, other, equivalent methods are also applicable. For example, a ZC sequence (m=0) is subject to division processing in the time domain with a ZC sequence (m=0), which a predetermined amount of shift (i.e. the amount of shift assigned per cell or mobile station regardless of transmission band) and the amount of shift in accordance with the transmission band is added to the ZC sequence, and masking processing section 162 performs masking processing for a desired window, and therefore may extract a correlation value from the period (i.e. window part) where the correlation value of the desired cyclic shift sequence is present.

Next, the operations of above-described second cyclic shift section 203 will be explained using FIG. 18. Here, in cell #2, the ZC sequence, which is a cyclic shift sequence m=2, having a sequence length N=24 and sequence number r=2 is used.

Figure 18:
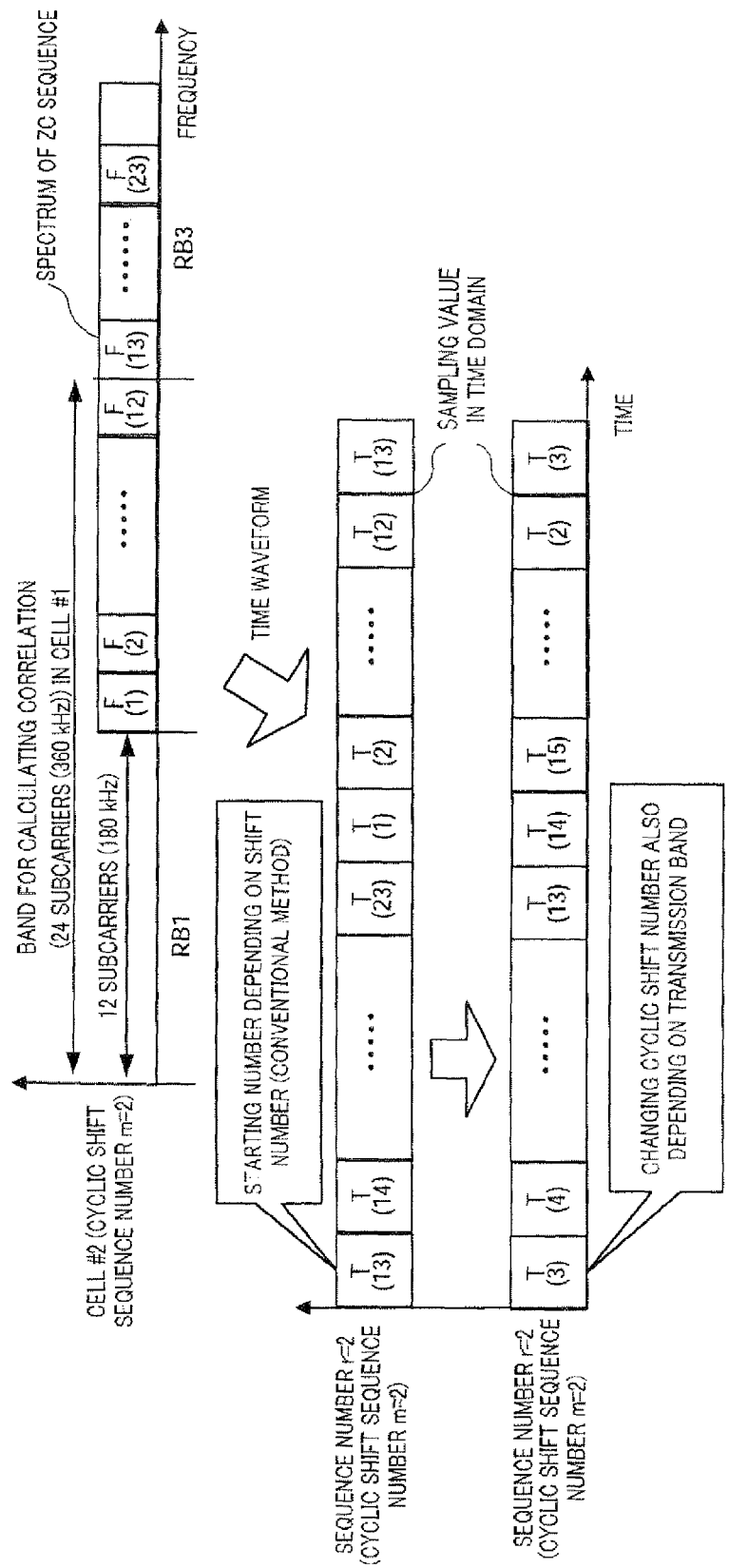
FIG. 18 is an illustration provided to explain the second cyclic shift section shown in FIG. 17.

As shown in FIG. 18, second cyclic shift section 203 changes the amount of shift in accordance with the transmission band of a cyclic shift sequence in the time domain in addition to the amount of shift in the time domain set in first cyclic shift section 202. This amount of shift is an additional amount of shift given to a transmission RS signal so that this amount of shift is detected as the amount of cyclic shift set in first cyclic shift section 202 when the correlation value is calculated in an arbitrary band, and this amount of shift varies depending on the sequence length, sequence number, intervals between subcarriers and correlation value between the reference point (i.e. the reference subcarrier) and the frequency band for transmission. For example, the table shows an example of amounts of shift (the amounts of shift to modify) that fulfills specific relationships at 15 kHz subcarrier intervals. Here, shift of the amounts of cyclic shift is shown in the case where the ZC sequence having a sequence length of 23 is assigned to the band 12 subcarriers (i.e. one RB) apart from the reference point, and the amounts of shift to modify derived from the amounts of cyclic shift.

TABLE 1

| | Sequence number: r | | | | | | |
|---|---|---|---|---|---|---|---|
| | 1 | 2 | 3 | 4 | 5 | 6 | ... 22 |
| Shift of cyclic shift by 12 subcarriers apart | 11 | 17 | 19 | 20 | 16 | 21 | ... 12 |
| Amount of shift to modify | 12 | 6 | 4 | 3 | 9 | 2 | ... 11 |

These amounts of cyclic shift will be represented by the following equation. Adding a frequency offset of one subcarrier interval (15 kHz) is equivalent to cyclically shifting a ZC sequence by the number of symbols represented as $c_{shift}$ in equation 2.

$$c_{Shift} = (N \cdot s - 1)/r \quad \text{(Equation 2)}$$

Here, N is the sequence length, r is the sequence number (r and N are coprime) and s is the smallest natural number to make $c_{Shift}$ an integer. Therefore, when a ZC sequence is assigned to the frequency band X subcarriers apart, a cyclic shift sequence of a ZC sequence $a_r(k)$ is provided, as shown in equation 3.

$$a_r(k + X \cdot c_{Shift} \bmod N) \quad \text{(Equation 3)}$$

Therefore, in the case of assigning a ZC sequence to a frequency band X subcarriers apart, by adding a cyclic shift to the ZC sequence according to equation 4, the amount of cyclic shift in equation 3 can be cancelled, so that it is possible to show the position of a correlation value peak at a desired timing.

$$-X \cdot c_{Shift} \bmod N \quad \text{(Equation 4)}$$

For example, assume that a sequence of a sequence number r=1 and amount of first cyclic shift Δ=12 (the starting number is 13) is received as input. At this time, when the amount of shift in second cyclic shift section 203 is calculated according to the above equation, the amount of cyclic shift is 0 in the band (e.g. RB 1 and RB 2) 0 subcarriers (0 kHz) apart from the reference point and 11 in the band (e.g. RB 2 and RB 3) 12 subcarriers (180 kHz) apart from the reference point. That is, the cyclic shift is not performed for the transmission in the band 0 kHz apart from the reference point (the amount of shift of 0) and the cyclic shift sequence where the starting number is 13 (i.e. shown in T(13)) is outputted. On the other hand, for the transmission in the band 12 subcarriers (180 kHz) apart from the reference point, the amount of cyclic shift of 12 is applied and the starting number of the cyclic shift sequence is 3 (T(3)).

At this time, the base station and the mobile station may both store the above table in which the amounts of shift vary in accordance with the transmission bands. Further, the RB allocation information is assigned to the above equations 2 to 4, and may be calculated and obtained by the base station and the mobile station.

In a conventional method, an RS is transmitted with starting number 13 in accordance with the cyclic shift sequence number in first cyclic shift section 202, regardless of whether the transmission band is 0 subcarriers (0 kHz) or 12 subcarriers (180 kHz) apart from the reference point, for example.

Although a case has been explained above about cell #2, in other cell (e.g. cell #1), too, the RS is transmitted with the starting number determined by applying an amount of shift in accordance with the transmission bandwidth in second cyclic shift section 203, to the cyclic shift sequence number in first cyclic shift section 202.

Figure 19:
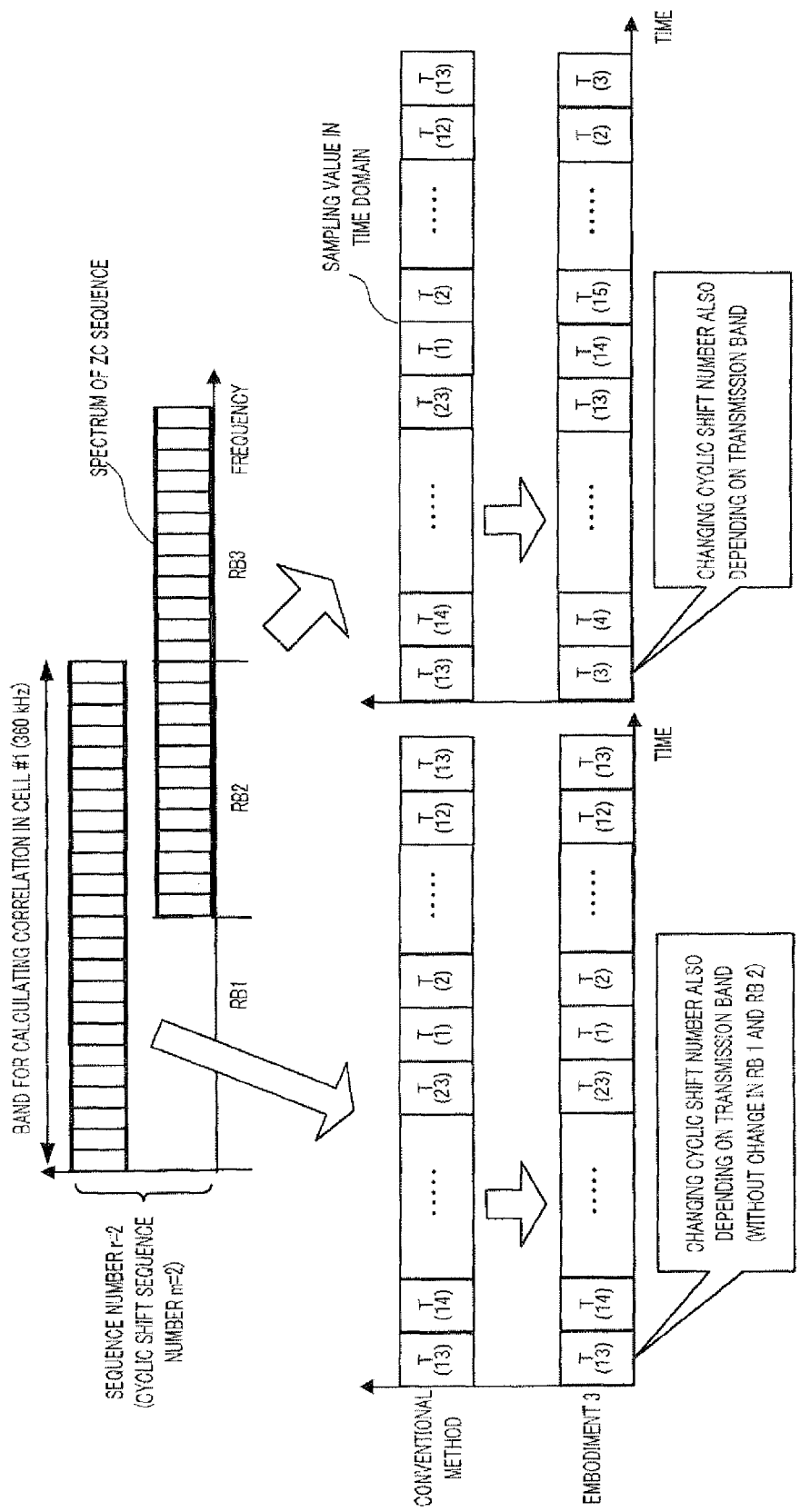
FIG. 19 is an illustration provided to explain the second cyclic shift section shown in FIG. 19.

To be more specific, as shown in FIG. 19, in the case of transmitting an RS in the band 0 kHz apart from the reference point, the starting number according to the present embodiment is the same as in a conventional method, that is, T(13), which is the amount of shift set in first cyclic shift section 202.

Further, in the case of transmitting an RS in the band 12 subcarriers (180 kHz) apart from the reference point, the starting number according to a conventional method in cell #2 is T(13), that is the same as in the transmission in the band 0 subcarriers (0 kHz) apart from the reference point. On the other hand, the starting number with the present embodiment is T(3) by changing the amount of shift in accordance with the relative position from the reference point of the transmission band.

In this way, in addition to T(13), which is the starting number according to a conventional method, the amount of shift in accordance with the relative position from the reference point of transmission bands is added. 12 is added here as the amount of shift in second cyclic shift section 203, and this varies depending on the sequence length, sequence number, subcarrier interval and correlation value between the reference point (i.e. reference subcarrier) and the frequency band for transmission.

The above method is an example of the method of maintaining relative relationships between cyclic shift sequences, but this method or above table 1 is by no means limiting, and other methods may be used as long as the relative relationships between cyclic shift sequences can be maintained by changing the second cyclic shift in accordance with the relationships between positions of a reference point and a transmission band.

In this way, according to Embodiment 3, in addition to the amount of shift in the time domain set in the first cyclic shift section, by changing the amount of shift in accordance with transmission bands of cyclic shift sequences in the second cyclic shift section, it is possible to generate correlation values in the positions corresponding to the amounts of shift set in the first cyclic shift section. Therefore, it is possible to reduce interference except for the window corresponding to the amount of shift set in the first cyclic shift section and improve the accuracy of channel estimation.

Although a case has been explained above with the present embodiment where the amount of shift in the time domain is changed in accordance with the sequence length, the sequence number and the subcarrier interval of a cyclic shift sequence and the correlation value between the reference point (i.e. the reference subcarrier) and the frequency band for transmission, in addition to the amount of shift set in the time domain, the present invention is not limited to this, and the cyclic shift sequence numbers assigned to cells belonging to the same base station may be determined based on the sequence length, the sequence number and intervals between subcarriers in the cyclic shift sequence and the correlation value between the reference point (i.e. the reference subcarrier) and the frequency band for transmission. Now, a detailed explanation will be provided below.

According to a conventional method, regardless of the sequence length, sequence number, interval between subcarriers and transmission band (i.e. RB position) of an RS, the same cyclic shift sequence number (i.e. the same amount of cyclic shift) is assigned to cells. For example, the cyclic shift sequence number #1 is assigned to cell #1, and the cyclic shift sequence number #2 is assigned to cell #2 (see FIG. 20A).

On the other hand, with the present embodiment, different cyclic shift sequence numbers are assigned between cells, depending on the sequence length, sequence number, interval between subcarriers and transmission band (i.e. RB position) of the RS. For example, in cell #1, the cyclic shift sequence number #1 is assigned in the case of transmitting the RS with RB 1 and RB 2 and the cyclic shift sequence number #2 is assigned in the case of transmitting the RS with RB 2 and RB 3. Further, in cell #2, the cyclic shift sequence number #2 is assigned in the case of transmitting the RS with RB 1 and RB 2, and the cyclic shift sequence number is #1 is assigned in the case of transmitting the RS with RB 2 and RB 3 (see FIG. 20B).

Figure 21:
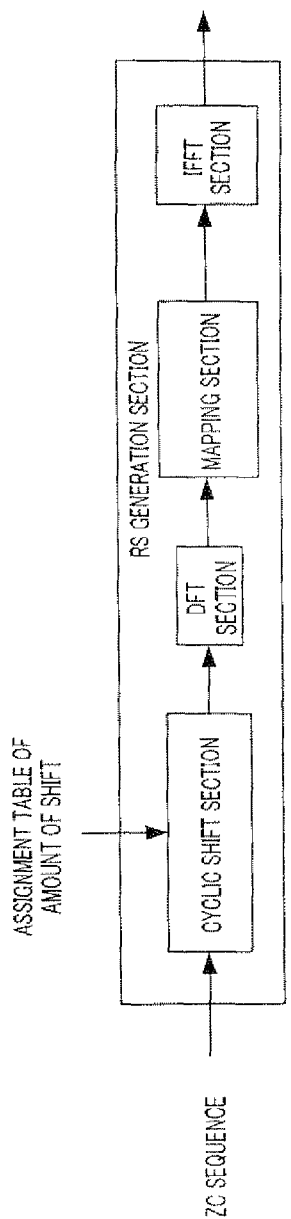
FIG. 21 is a block diagram showing the internal configuration of the RS generation section in the case where the assignment table shown in FIG. 20 is used.

At this time, in the configuration of RS generation section 201, first cyclic shift section 202 and second cyclic shift section 203 shown in FIG. 17 may be combined as a cyclic shift section as shown in FIG. 21, and the amount of shift may be assigned in accordance with the amount of shifts in an assignment table.

Further, although a configuration has been explained with the present embodiment as an example where second cyclic shift section 203 is placed between first cyclic shift section 202 and DFT section 204, second cyclic shift section 203 may be placed before first cyclic shift section 202 or may be placed after IFFT section 206.

Further, although cases have been mainly explained with the above embodiments where the local cell and nearby cells use different bands for RS transmission and yet the same transmission bandwidth, cases are also possible where the respective RSs are transmitted in different transmission bandwidths and consequently use different RS transmission bands. For example, cases are possible where, in the local cell, two RBs, RB 1 and RB 2, are assigned to a certain mobile station, and where, in a nearby cell, RB 1 and RB 2 are assigned to two different mobile stations in that nearby cell. In such a case, a ZC sequence of a different length is divided in dividing processing in the local cell for an RS that has arrived from a mobile station in a nearby cell, and therefore an RS from a mobile station in a nearby cell may produce its correlation value peak in the window for the local cell, and it is not possible to separate the delay profile for the local cell and the delay profile for the nearby cell, and, as a result, interference occurs.

In such a case, the RS transmission band and the starting number of the spectrum of a ZC sequence are associated. That is, by associating different frequency bandwidths from the reference point of a transmission band and starting numbers of spectra of ZC sequences to fulfill specific relationships in accordance with the sequence length, it is possible to reduce interference. In other words, when an RS is transmitted, it is possible to reduce interference by providing a phase shift in the frequency domain by the amount of a predetermined shift determined by the transmission band and transmission bandwidth, or by providing a cyclic shift in the time domain.

Further, the above embodiments are not limited to cyclic shift sequences and are applicable to any and all sequences. For example, even when different ZC sequences are assigned to a plurality of cells belonging to the same base station, the mobile station and the base station may carry out transmission and division using a sequence subject to cyclic shift in the time domain or in frequency domain in accordance with the transmission band. In this way, by unifying the transmission processing and receiving processing, the entire system is subject to the same rules, and therefore the transmitting processing and receiving processing become easy.

Further, although cases have been explained with the above embodiments where cyclic shift sequence numbers #1 and #2 alone are used, the present invention is not limited to this, and large cyclic shift sequence numbers may be used (for example, #1 to #6).

Figure 22:
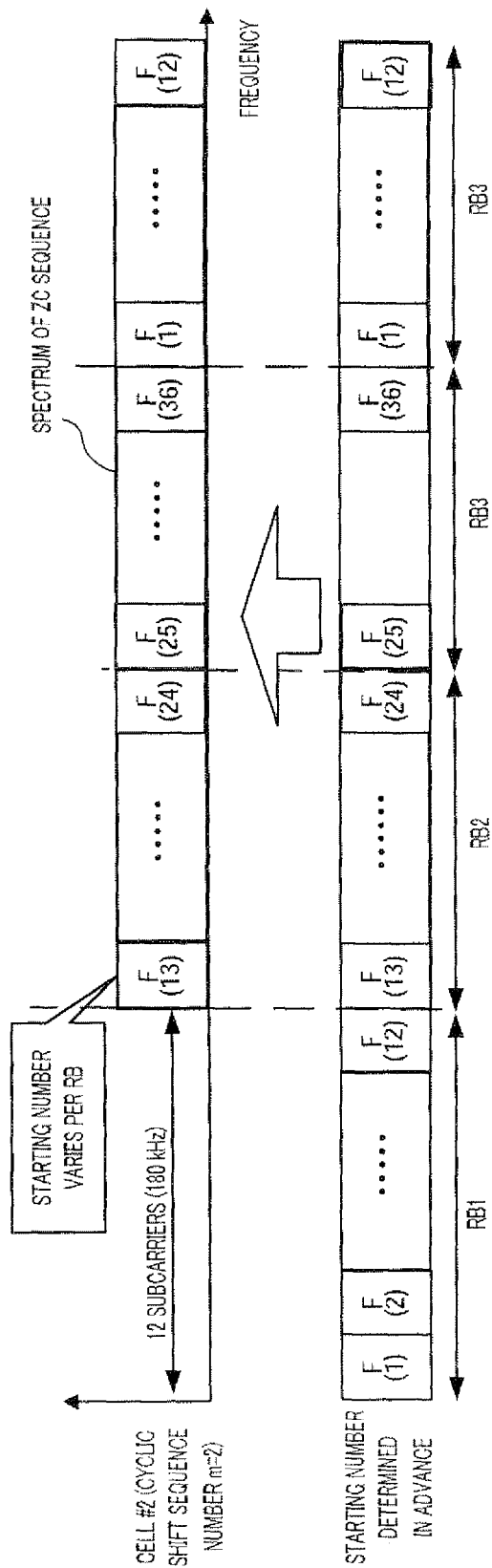
FIG. 22 shows how to generate a cyclic shift sequence having an RS transmission bandwidth of 3 RBs.

Further, although cases have been explained with the above embodiments where the RS transmission bandwidth is two RBs, the present invention is not limited to this, and two or more RBs may be used. In this case, as shown in FIG. 22, the starting numbers of cyclic shift sequences used in the transmission bands are 1, 13, 25, 1 and 13 [ . . . ]. Here, the sequence length N=36.

Figure 23A:
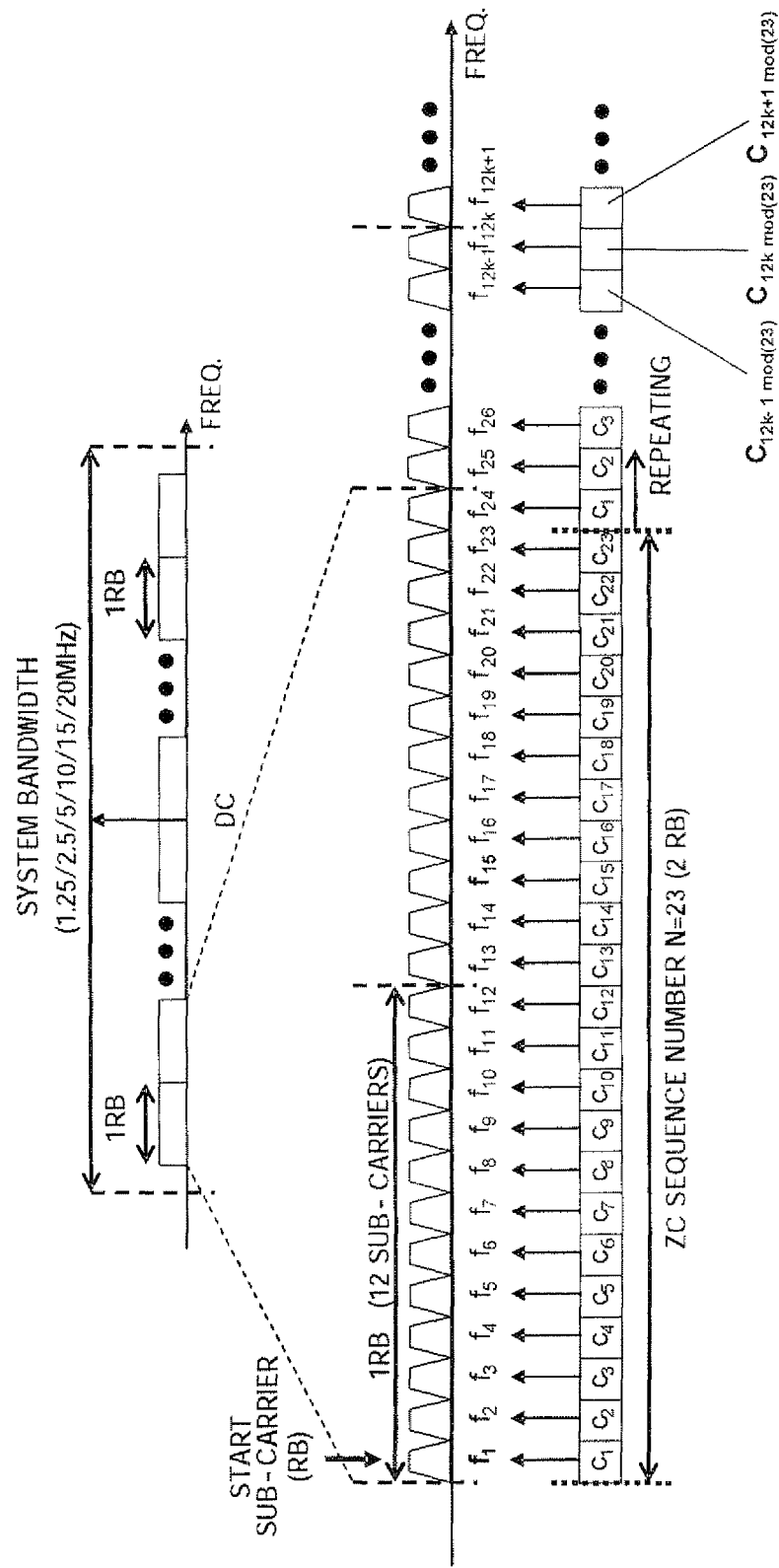
FIG. 23A shows how to define the reference point.
Figure 23B:
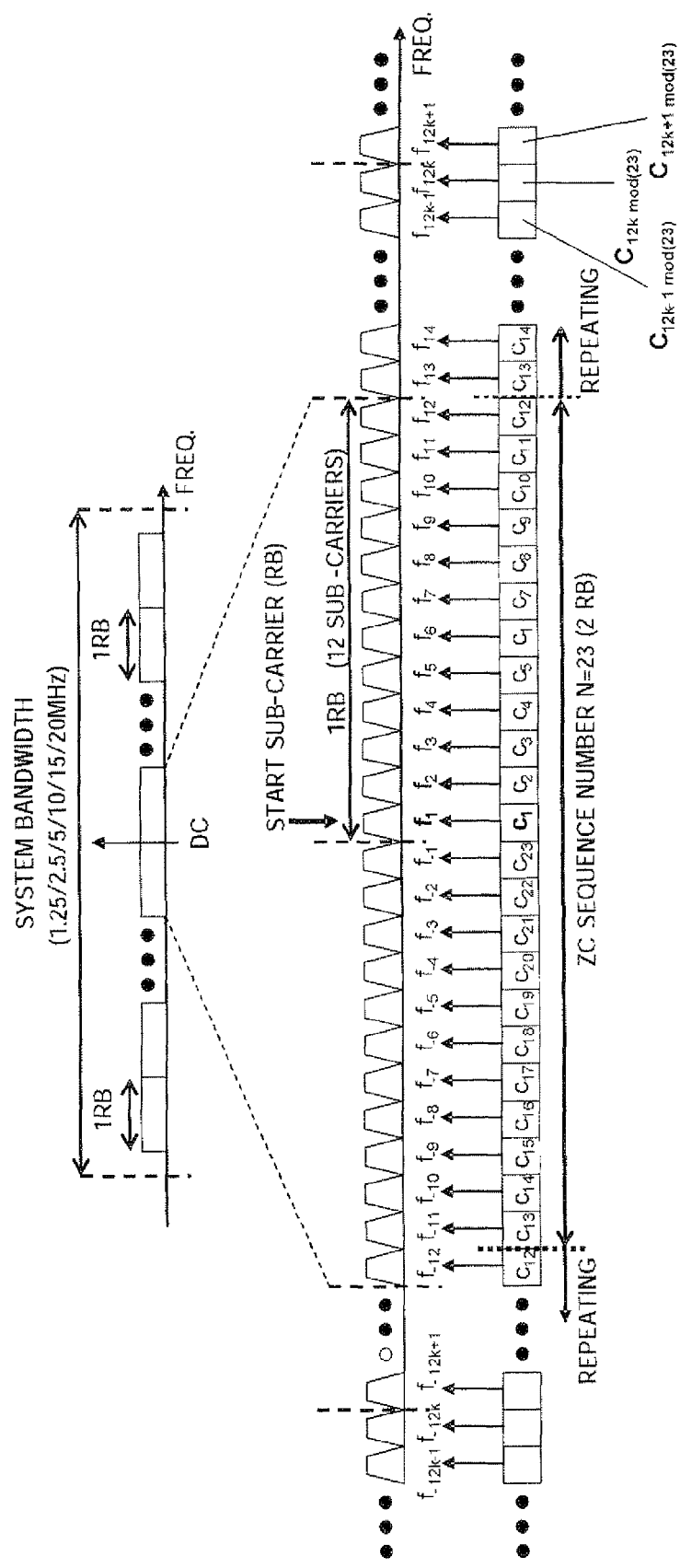
FIG. 23B shows how to define the reference point.

Further, in the Embodiments 1 and 2, the reference point may be the endmost subcarrier in the system transmission band as shown in FIG. 23A, but the reference point may be the center subcarrier of the system transmission band as shown in FIG. 23B. Here, the relationships between the transmission ZC sequence coefficients and the subcarriers in FIG. 23A are shown in FIG. 24. That is, if $f_0$ is the reference point and $f_a$ is the subcarrier number, the ZC sequence coefficient $C_a$ for that subcarrier $f_a$ is $C_a = C_a \mod(23)$ (where the sequence length r=23). $C_a = C_a \mod(X)$ is the remainder left after $C_a$ is divided by X. By using these relationships, pattern generation section 109 can obtain the ZC sequence coefficients for each subcarrier in an assigned transmission RB. The reference point is common between cells that need to maintain relative relationships between cyclic shift sequences.

Further, the above embodiments are an example of methods for maintaining the relative relationships of cyclic shifts, and are not limited to these if methods for maintaining the relative relationships of cyclic shifts are applied. That is, any method may be applied if a correlation result of interference components is included in the period (i.e. the window parts) where a correlation value of cyclic shift sequences is present using a common reference point (a frequency or a subcarrier) between a plurality of cells.

Further, although cases have been explained with above embodiments as an example where data and reference signals are transmitted from the mobile station to the base station, the same may be applied to the case of transmission from the base station to the mobile station.

Further, although cases have been explained with above embodiments to use a CAZAC sequence and its cyclic shift sequences as reference signals, the present invention is not limited to this. For example, the same may be applied to the case where transmission is carried out in different transmission bands between cells using cyclic shifts, for example, using reference signals for uplink channel quality estimation, preamble sequences for random access and reference signals for downlink synchronization channel. Further, the present invention may be applied to GCL (Generalized Chirp Like) sequences, Frank sequences, PN sequences such as M sequences and gold sequences, sequences to truncate or cyclically extend CAZAC sequences, sequences to puncture ZC sequences, Random CAZAC sequences, OLZC sequences, RAZAC sequences and other CAZAC sequences (including sequences generated by a computer). A reference signal may be referred to as a "pilot signal," "criteria signal," "basis signal" and so on.

Further, the present invention is also applicable when CAZAC sequences are used as spreading codes for code division multiplexing (CDM) or code division multiple access (CDMA), and when correlation is calculated in different RB transmission bands, it is possible to prevent relative relationships from losing between sequences and prevent correlation value peaks of interfering waves from detecting detection windows of correlation value peaks of desired waves.

Further, although uplink has been explained as an example with the above embodiments, downlink is applicable as well. Further, the embodiments are not limited to 3GPP LTE systems.

Further, the number of subcarriers and bandwidth per RB used in the explanation are just an example and the present invention is not limited to these values.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-022072, filed on Jan. 31, 2007, including the specification, drawings and abstract, is incorporated herein by reference in its entirety.

Industrial Applicability

The present invention is applicable to, for example, mobile stations in the mobile communication systems.

The invention claimed is:

1. A radio transmission apparatus comprising:
    a generator configured to determine a pattern of a sequence based on a relationship between a starting number of the sequence and a position of a transmission band from a common reference point of the transmission band, the transmission band being a transmission band of a signal transmitted from the radio transmission apparatus, and a transmission bandwidth of the signal, and configured to form the sequence in accordance with the pattern, wherein the relationship and the common reference point are common between a local cell in which the radio transmission apparatus is currently located and a cell adjacent to the local cell; and
    a transmitter configured to transmit the signal including the sequence, wherein the sequence is generated with a cyclic shifting, using an amount of shift in accordance with the determined pattern of the sequence, in addition to an amount of shift set in a time domain.

2. A radio transmission method performed by a radio transmission apparatus, the radio transmission method comprising:
    determining a pattern of a sequence based on a relationship between a starting number of the sequence and a position of a transmission band from a common reference point of the transmission band, the transmission band being a transmission band of a signal transmitted from the radio transmission apparatus, and a transmission bandwidth of the signal, and configured to form the sequence in accordance with the pattern, wherein the relationship and the common reference point are common between a local cell in which the radio transmission apparatus is currently located and a cell adjacent to the local cell; and
    transmitting the signal including the sequence, wherein the sequence is generated with a cyclic shifting, using an amount of shift in accordance with the determined pattern of the sequence, in addition to an amount of shift set in a time domain.

3. The radio transmission apparatus according to claim 1, wherein the common reference point of a frequency domain comprises an endmost frequency or center frequency of a system band.

4. The radio transmission apparatus according to claim 1, wherein the generator allocates the sequence generated using a spectrum number corresponding to the determined pattern of the sequence to the transmission band in a frequency domain.

5. A radio reception apparatus comprising:
    a receiver configured to receive a reference signal comprising a sequence generated with a cyclic shifting having an amount of shift in accordance with a pattern of the sequence, in addition to an amount of shift set in a time domain; and
    a channel estimator configured to perform a channel estimation using the sequence based on a determined relationship between a starting number of the sequence and a position of a transmission band from a common reference point of the transmission band, the transmission band being a transmission band of the reference signal transmitted from a radio transmission apparatus, and a transmission bandwidth of the reference signal, wherein the determined relationship and the common reference point are common between a local cell in which the radio transmission apparatus is currently located and a cell adjacent to the local cell.

6. A radio reception method performed by a radio reception apparatus, the radio reception method comprising:
    receiving a reference signal comprising a sequence generated with a cyclic shifting having an amount of shift in accordance with a pattern of the sequence, in addition to an amount of shift set in a time domain; and
    performing a channel estimation using the sequence based on a determined relationship between a starting number of the sequence and a position of a transmission band from a common reference point of the transmission band, the transmission band being a transmission band of the reference signal transmitted from a radio transmission apparatus, and a transmission bandwidth of the reference signal, wherein the determined relationship and the common reference point are common between a local cell in which the radio transmission apparatus is currently located and a cell adjacent to the local cell.

* * * * *